United States Patent [19]

Basnuevo et al.

[11] Patent Number: 5,177,739
[45] Date of Patent: Jan. 5, 1993

[54] MULTIPORT - MULTIPOINT DIGITAL DATA SERVICE

[75] Inventors: Rogelio J. Basnuevo, Miami; Jose R. Diaz, Sunrise, both of Fla.; Norman J. Donaghue, Reston, Wash.; Jorge A. Valdes, Miami; Stephen J. Winter, Sunrise, both of Fla.

[73] Assignee: Racal Data Communications, Inc., Sunrise, Fla.

[21] Appl. No.: 513,353

[22] Filed: Apr. 20, 1990

[51] Int. Cl.⁵ .......................... H04J 3/06; H04J 3/16
[52] U.S. Cl. .................................. 370/85.8; 370/95.2; 370/100.1; 370/108; 375/109; 340/825.08
[58] Field of Search ................. 370/85.1, 85.7, 85.8, 370/85.9, 85.13, 95.1, 95.2, 95.3, 100.1, 101, 102, 103, 104.1, 105.1, 108, 110.1, 111, 112; 340/825.06, 825.07, 825.08, 825.14, 825.2; 375/109

[56] References Cited

U.S. PATENT DOCUMENTS

| | | | |
|---|---|---|---|
| 3,244,804 | 4/1966 | Wittenberg | 370/95.2 |
| 4,251,865 | 2/1981 | Moore et al. | 370/95.2 |
| 4,335,464 | 6/1982 | Armstrong | 375/43 |
| 4,562,573 | 12/1985 | Murano et al. | 370/85.1 |
| 4,601,030 | 7/1986 | Croisier | 370/85.1 |
| 4,653,049 | 3/1987 | Shinmyo | 370/95.2 |
| 4,689,619 | 8/1987 | O'Brien, Jr. | 370/95.2 |
| 4,694,453 | 9/1987 | Kobayashi et al. | 370/85.7 |
| 4,726,017 | 2/1988 | Krum et al. | 370/95.2 |
| 4,745,601 | 5/1988 | Diaz et al. | 370/110.1 |
| 4,773,065 | 9/1988 | Kobayashi et al. | 370/67 |
| 4,797,878 | 1/1989 | Armstrong | 370/95.2 |
| 4,858,230 | 8/1989 | Duggan | 370/95.2 |
| 4,862,480 | 8/1989 | Gupta | 375/37 |
| 5,043,982 | 8/1991 | Werner | 370/100.1 |

OTHER PUBLICATIONS

AT&T Technical Reference "Digital Data System Channel Interface Specification", Nov. 1987.
Bell System Data Communications Technical Reference "Multistation Dataphone Digital Service", Sep. 1974.
American Telephone and Telegraph Co. Bell System Technical Journal vol. 51, No. 8, Oct. 1972 U.S.A.
American Telephone and Telegraph Co., Bell System Technical Journal vol. 54, No. 5, May-Jun. 1975, U.S.A.
American Telephone and Telegraph Co., Bell System Technical Reference Pub. 41021, 1973, U.S.A.
American Telephone and Telegraph Co., Bell System Data Comm., Technical Reference Pub. 41450, Nov. 1981, U.S.A.
American Telephone and Telegraph Co., Data Communication Protocol Standards, Pub 62120, Apr. 1984, U.S.A.

Primary Examiner—Douglas W. Olms
Assistant Examiner—Alpus H. Hsu
Attorney, Agent, or Firm—Nixon & Vanderhye

[57] ABSTRACT

In a Digital Data System (DDS) a method and apparatus for providing multipoint multiport service. Differences in time delays through the network are compensated by an alignment training wherein the delays from each remote station are measured at a Central station. The Central station determines how much delay to insert at each remote station and then instructs the remote stations to insert the delays. This allows all inbound data to be aligned in time so that when the data are combined within the network by the Multipoint Junction Units (MJU) data errors are not produced. Aligned frames are combined in the MJU operating in data mode in a logical AND operation so that marks transmitted by inactive ports are combined with data from active ports to produce a composite signal which is passed to the Central DSU.

40 Claims, 12 Drawing Sheets

MULTIPORT - MULTIPOINT DIGITAL DATA SERVICE

BACKGROUND OF THE INVENTION

1. Field of the Invention

This invention relates generally to the field of multiplexed digital data communications. More particularly, this invention relates to an access device for a digital network such as a digital service unit (DSU) for interconnecting a plurality of terminal devices running different applications and permitting them to share a single transmission channel in a multipoint multiport environment.

2. Background of the Invention

The term Digital Service Unit (DSU), as used herein, may in general also embrace combined Digital Service Unit/Customer Service Units (CSU). CSU's, or similar digital network access devices as will be appreciated by those skilled in the art. It may also embrace similar devices operating in digital data networks.

There are many business environments wherein multiple transmission lines are used to carry data to and from various terminal type devices. Typically, the total average data rate for these devices is less than the capacity of a single digital transmission line. Separate lines are often used because of protocol incompatibilities. separate applications being simultaneously run, gradual evolution of a communication network, connection to more than one Central computer, etc.

One typical example of such a system is that of a bank or other financial institution wherein at a single physical location there exists one or more terminals for use by tellers, terminals used by loan officers, accountants and the like for running other financial applications and automated teller machines (ATM). Another example is that of the retail industry wherein point of sale terminals (POST), credit verification terminals and accounting terminals may all use individual transmission facilities. Each of these may use their own dedicated analog or digital leased transmission lines which are not fully utilized. Conversion to a single digital multipoint multiport circuit may be more cost effective in many cases. Even if the transmission lines are fully utilized, conversion to a higher rate DDS service using a multipoint multiport circuit may result in substantial telecommunications cost savings.

When analog data modems are used, various techniques have been devised to facilitate sharing of transmission facilities and thus reduce telecommunications costs. For example, there are data modems which utilize frequency division multiplexing to divide a single transmission line into several channels. An example of such a scheme is shown in U.S. Pat. No. 4,335,464 to Armstrong et al. A time division approach for modems has also been proposed in European Patent Application number 88304437.2 published Nov. 23, 1988 under publication number 0292226. Another approach for modems has been described in U.S. Pat. application Ser. No. 07/355.521 assigned to the assignee of the present invention and incorporated herein by reference.

In order to achieve higher reliability in data communications at higher speed, many users are converting to all digital networks such as DDS networks. Multipoint (or Multidrop) circuits in DDS networks use multipoint junctions units (MJU's) or similar digital bridging devices to combine inbound data from each of the remote units.

An MJU (in a DDS network) allows two different modes of primary channel operation in the inbound direction. The mode is set in DDS-II by the control bit and in DDS-I by a bipolar violation sequence. In the first method (data mode), all remote stations transmitting to the Central station keep the primary channel in the data mode even if it has no primary channel data to transmit. In place of primary channel data, the Remote stations simply transmit all marks (all data bits set to logic ones). In this mode of operation, the MJU combines the data bits from different drops using the equivalent of a logic AND operation so that if any station transmits a zero, a zero will be passed to the Central. Otherwise, a logic one will be sent to the Central. This is the mode of operation which is used for the present invention.

In the second mode of operation (the control mode), the remote stations keep the data channel in the control mode by sending control mode idle (CMI) when there is not data to sent. In this mode, the remote station switches to data mode only when it has actual data to send. When the MJU receives a control code on any of the drops, it internally forces the data bytes from those drops to all marks (ones) prior to providing the logical AND bridging process. If all drops are inactive, the CMI sequence propagates to the Central. This second mode generally has the advantage that the CMI sequence can be used to distinguish between an active channel and an inactive channel thus providing DCD (Data Carrier Detect) control. This second mode of operation is conventionally the preferred mode of operation of a DDS network for multidrop operation in a DDS network.

In the case of DDS S/C, the MJU is also responsible for detecting secondary channel activity from a drop in order to bridge it with the primary channel data sent to the Central. In this case, however, the design of the MJU permits only one active secondary channel and ignores any other secondary channel activity from other drops.

For the preferred embodiment of the present invention, the network, and thus the access devices and MJU's, are used in the data mode rather than the control mode so that any remote station which is not transmitting data transmits all marks. Although using this mode does not provide the advantage of allowing simplified DCD control, it provides a convenient mechanism for permitting the alignment process of the present invention to be performed and multiport multidrop service to be provided.

The MJU's operating in the data mode basically perform a digital bridging function analogous to a logical AND operation on the primary data of the active channels in order to combine the data from the different points or drops in the circuit. This function may variously be referred to herein as an AND function, digital bridge function or MJU function synonymously and should not be strictly limited to the DDS definition of an MJU. The present invention is applicable to any digital network using similar digital bridging techniques. The MJU may be either embedded in the network, for example as part of a digital crossconnect system (DCS), or may be in the form of an MJU plug in card as will be appreciated by those skilled in the art.

Simple multi-point operation is contemplated by the DDS service providers and described in their various specifications. In simple multipoint operation, data from each remote does not need to be aligned in time since only one remote is polled by the Central (and therefore capable of transmitting) at any given time. However, time alignment of inbound data traffic may be required in some situations of multipoint multiport operation. For example, in multiport multipoint operation several remote sites may be polled simultaneously on different ports by their respective applications running at the Central site at any given time. Thus, the remote could transmit simultaneously during a portion of their inbound response to the poll if there is no time alignment of inbound frames. Since this would result in data errors, appropriate time alignment should be obtained.

More detailed technical information regarding the various Digital Data Systems may be obtained in the various technical specifications published by AT&T and other digital service providers for their digital data systems (e.g. AT&T Communications Technical Reference PUB 62120, 1984). Additional information is also available in U.S. Pat. No. 4,745,601 to Diaz et al. which is incorporated herein by reference.

The present invention provides a cost effective method and apparatus for accomplishing the multiport multidrop function in a digital network such as the DDS service provided by AT&T and provides for alignment of the inbound frames from remote DSU's. The present invention takes advantage of the characteristics of the digital bridging function to properly combine inbound multiport data. The present invention details a novel method to ensure the integrity of inbound TDM data from various drops of a DDS multidrop multiport network. This alignment method ensures that each bit transmitted from each remote arrives at the Central DSU properly mixed. Thus responses sent by different remote terminals connected to different remote DSU's can be kept in their appropriate TDM slots with respect to other neighboring TDM slots and not allowed to interfere with one another.

SUMMARY OF THE INVENTION

It is an object of the present invention to provide an improved multiplexed DSU for use in multidrop multiport environments.

It is a further object to provide a method for establishing synchronization between the various remote DSU's and the Central DSU on such a multiport multidrop network.

It is a further object and advantage of the present invention to take advantage of existing characteristics of widely available digital data networks to provide multipoint multiport service.

It is an advantage of the present invention to provide multiport multipoint communication in a digital network.

These and other objects and advantages of the invention will become apparent to those skilled in the art upon consideration of the following description of the invention.

In one aspect of the present invention, a synchronous digital multiport multipoint communication system includes a digital network for transporting digital data bits between a plurality of locations. A plurality of remote stations are coupled to the network. A Central station is also coupled to the network, the Central station transmitting outbound data from the Central station to the plurality of remote stations via the network. Transmission times of the plurality of remote stations are aligned to compensate for differences in delay through the network from the remote stations to the Central.

In another aspect of the present invention, a synchronous digital multiport multipoint communication system includes a Digital Data Service (DDS) network for transporting digital data bits between a plurality of locations, wherein the digital network combines data from the plurality of remote stations using a logical AND operation carried out in a Multipoint Junction Unit (MJU). A plurality of remote stations each including a Digital Service Unit (DSU), are coupled to the network. A Central station including a DSU is also coupled to the network, the Central station transmitting outbound data from the Central station to the plurality of remote stations via the network. Frames are established around digital signals transmitted from the remote stations to the Central station and from the Central station to the remote, the frames including a synchronization pattern and a slot dedicated to carrying multipoint polling commands. Access to transmission over the network by the remote stations is controlled by polling. Transmission times of the plurality of remote stations is adjusted to compensate for differences in delay through the network to the Central by measuring an amount of delay associated with each the remote station, comparing the delay with a reference delay, and transmitting a representation of the delay to the remote station so that the remote station delays future transmissions by an amount determined by the representation of the delay.

In another aspect of the present invention, a method for providing time alignment of frames of digital signals transmitted from a plurality of remote stations to a Central station, includes the steps of: establishing a reference time delay for arrival of a reference frame at the Central station; determining an amount of time adjustment relative to the reference time delay required to align a remote station's transmitted frames with the reference; and introducing the amount of time adjustment prior to transmissions from the remote station to cause frames transmitted by the remote station to arrive at the Central station in time alignment with the reference frame.

In another aspect of the present invention, a digital data network, a method for compensating for time delays in the network so that data transmitted from a plurality of remote stations in the network arrive at a predetermined location in time alignment, includes the steps of: commanding all of the remote stations to enter an idle state; having a remote station transmit a signal; measuring a difference in time delay between receipt of the transmitted signal and a reference time; adjusting a transmission time for transmissions from the remote station so that the measured difference in time delay is compensated.

A digital network access device, according to one embodiment of the invention, for providing multiport multipoint communication includes a first interface for interfacing to a plurality of Data Terminal Equipment (DTE) devices and a second interface for interfacing to a digital network. A framing circuit arranges data bits from the plurality of DTE devices into a data frame for transmitting to a Central location. Adjustment of the position in time of the data frame is made to align with a periodic reference time.

In another aspect of the present invention, digital network access device for providing multiport multipoint communication a receiver for receiving a framed signal from a remote network access device over a digital network. A measurement of an arrival time for the framed signal from the remote network access device in relation to a reference timer is made and a command is transmitted to the remote network access device instructing the remote network access device to adjust its timing so that the arrival time of future framed signals transmitted by the remote network access device arrive in time alignment with the reference timer.

In another embodiment, a multiport multipoint digital communication system includes a data network including at least one digital bridging device which combines digital input signals into a composite signal with an AND operation. A central site network access device receives the composite signal. A plurality of remote site network access devices located at a corresponding plurality of remote sites transmit aligned frames of digital signals to the data network. A multiplexer provides multiplexing of signals from a plurality of Data Terminal Equipment (DTE) devices at each of the remote sites to respective ones of the remote site network access devices.

In another aspect of the present invention, a method of communicating in a multiport multipoint digital network having digital bridges which perform an AND function on signals applied to inputs thereof, the network using a frame to arrange digital mark and space signals for transmission over the network, includes the steps of: transmitting a poll message from a first network access circuit to a second network access circuit, the poll message including an address of the second network access circuit; at the second network access circuit, detecting the address; and transmitting a sequence of spaces from the second network access circuit over the network, the sequence of spaces being positioned in time to overlap any marks transmitted by other network access circuits.

In another aspect of the present invention, a method of aligning inbound frames of digital signals bound for a Central site from remote sites, includes the steps of: at the Central site, issuing a global command for all remote sites to transmit marks in each frame location; commanding a first remote to transmit a frame containing a predetermined pattern; establishing a reference time at the central based upon time of receipt of the predetermined pattern; commanding a next remote to transmit the predetermined pattern; measuring a relative delay in receiving the predetermined pattern from the next remote; commanding the next remote to adjust its transmission time by an amount which causes transmissions from the first and next remote to arrive at the Central site in time alignment.

In another aspect of the present invention, a method of aligning inbound frames of digital signals bound for a Central site from remote sites, includes the steps of: (a) performing an initial alignment process so that frames transmitted from each the remote site arrive at the Central site in time alignment; (b) selecting a remote site from a polling list; (c) determining if the remote is properly aligned; (d) if the remote is properly aligned, selecting a next remote from the polling list and repeating step (c) for the next remote; (e) if the remote is not properly aligned in step (c), correcting alignment of the remote and then going to step (b).

According to an embodiment of the present invention, in a Digital Data System (DDS) a method and apparatus for providing multipoint multiport service.

Differences in time delays through the network are compensated by an alignment training wherein the delays from each remote station are measured at a Central station. The Central station determines how much delay to insert at each remote station and then instructs the remote stations to insert the delays. This allows all inbound data to be aligned in time so that when the data are combined within the network by the Multipoint Junction Units (MJU) data errors are not produced.

Another method of the present invention of combining data from a plurality of multiport remote stations for transmission to a Central station through a digital network, includes the steps of: arranging signals for transmission to the Central station from the remote stations into aligned frames; assigning positions in the frames to each port of each remote such that the corresponding ports at each remote are assigned the same frame positions; at an active port of one of the remotes, transmitting data bits in the assigned position for the port; at an inactive port at each remote corresponding to the active port, transmitting all marks in the assigned position in the frame for the port; combining the marks with the data bits in a digital bridge with an AND function to form a composite frame; and transmitting the composite frame to the Central station.

A method of providing multipoint multiport communication service in a digital network according to the invention, includes the steps of: receiving a first frame containing data in a predetermined time slot designated for use by a first port from a first network access device, the first port of the first network access device being an active port; receiving a second frame from a second network access device containing all marks in the predetermined time slot designated for use by the first port of the second network access device, the second frame aligned in time with the first frame and the first port of the second network access device being an inactive port; combining bits in the first and second frames by a logical AND function to produce a composite frame; and transmitting the composite frame to a third network access device.

Another method of providing multipoint multiport communication service in a digital data network, includes the steps of: receiving a first frame containing data in a predetermined time slot designated for use by a first port from a first multiport remote digital service unit, the first port of the first multiport remote digital service unit being an active port; receiving a second frame from a second remote multiport digital service unit containing all marks in the predetermined time slot designated for use by the first port of the second remote multiport digital service unit, the second frame aligned in time with the first frame and the first port of the second remote digital service unit being an inactive port; combining bits in the first and second frames by a logical AND function in a multipoint junction unit to produce a composite frame; and transmitting the composite frame to a Central digital service unit.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
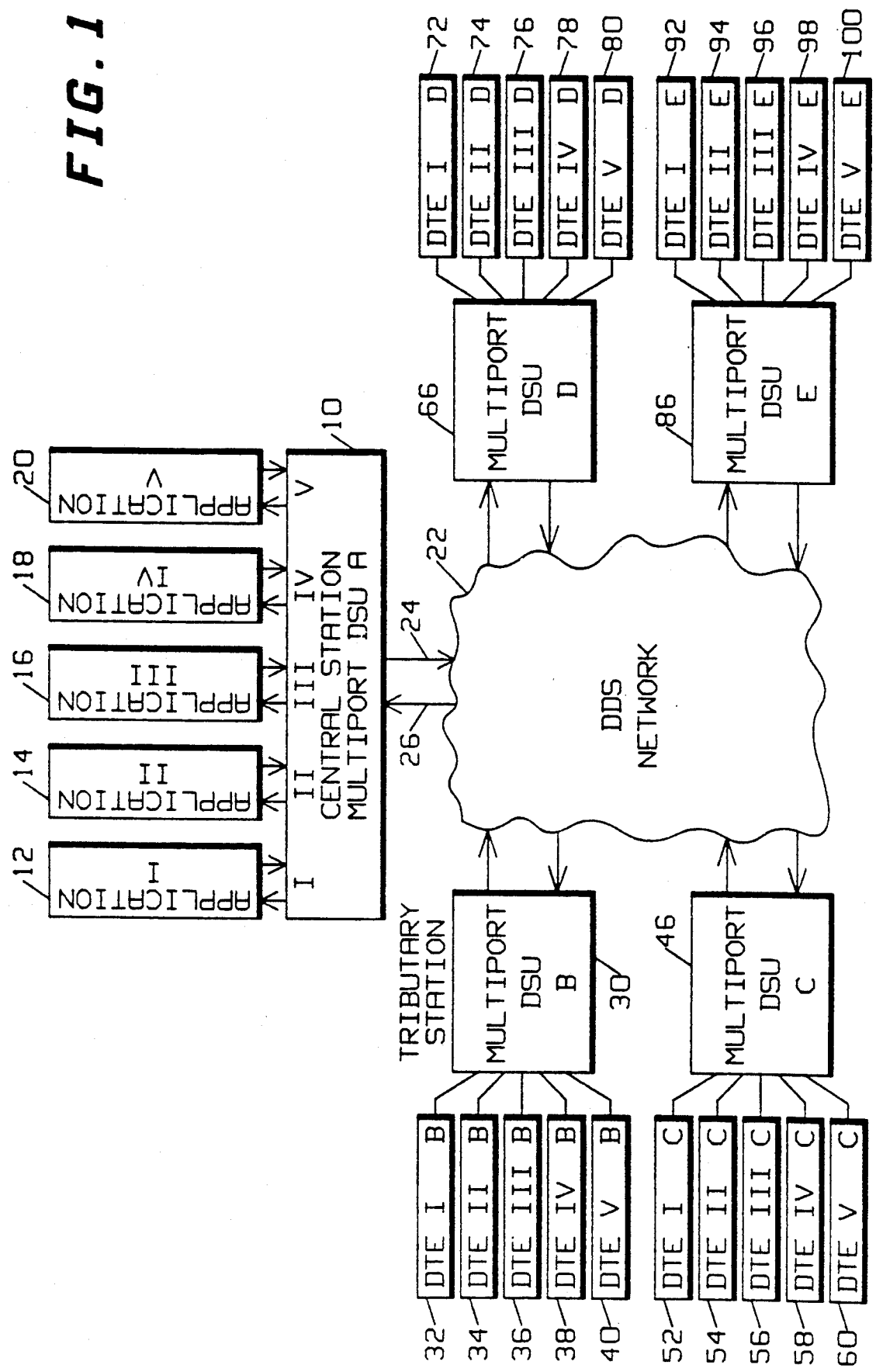
FIG. 1 is a block diagram of an example system utilizing the present invention.

Turning now to FIG. 1, there is shown a simple network used to illustrate the overall operation of the present invention. The network includes a Central site Multiport DSU 10 (a DSU incorporating a time division multiplexer and circuitry to be described later) which is connected, for example, to a plurality of host computers through a Front End Processor FEP (not shown) via ports I-V. Each host computer (not shown) may be running a different application program, or in a similar scenario, two or more application programs (e.g. Automated Teller software, accounting software, etc.) may be simultaneously and independently running on the same computer. In this example, five such applications (I-V) are shown as applications 12, 14, 16, 18 and 20. For purposes of this discussion the term "application" is intended to embrace each of the above possible scenarios and variations thereof. For purposes of this discussion the terms "inbound" and "outbound" will be with respect to a Central site.

On the other side of Central site DSU 10 is a DDS or similar digital network 22 having an outbound path 24 and an inbound path 26 with respect to the Central site DSU 10. Recall that throughout this discussion, the terms inbound and outbound are always referenced to the Central site DSU 10 unless clearly indicated otherwise. For purposes of illustration, assume that the network 22 provides 38.4 Kbps DDS with each application being allocated 7.2 Kbps of primary channel bandwidth (six frame slots as will become clear later). Of course, this rate is merely illustrative of the present invention and is not intended to be limiting.

A plurality of remote site DSU's are attached to the network 22 at a plurality of remote locations by using the services of one or more Multipoint Junction Units (MJU) or digital bridges within the network (not shown explicitly). In this example, four such DSU's are shown attached to the network 22 with a first such remote site DSU 30 attached to the network 22 at a first remote location. Remote site DSU 30 is coupled to five terminal devices 32, 34, 36, 38 and 40 which communicate with applications 12, 14, 16, 18 and 20 respectively. The terminal devices may be, for example, computer terminals, point of sale terminals, credit verification terminals, automated teller machines, etc.

A second remote site DSU 46 is also coupled to the network 22 to provide network services to five remote DTE's 52, 54, 56, 58 and 60 which similarly communicate with applications 12, 14, 16, 18 and 20 respectively as shown. A third remote site DSU 66 is also coupled to the network 22 to provide network services to terminal devices 72, 74, 76, 78, and 80 as shown. A fourth remote site DSU 86 is also coupled to the network 22 to provide network services to terminal devices 92, 94, 96, 98, and 100 as shown. Of course, more or fewer such remote site DSU's may be dropped along network 22 in the present invention.

In a more conventional simple multipoint arrangement for providing the above communications, it would be possible to provide communication between DTE devices 32, 52, 72 and 92 and the application (e.g. host) 12 using a single multipoint DDS circuit or similar analog circuit. In order to provide connections for the remaining applications, a separate DDS or analog circuit would have to be provided. That is each application would require its own circuit. Obviously, if it were possible to reduce the number of DDS or analog circuits required, there would be potential for substantial cost savings. By more fully utilizing the bandwidth available on a given DDS circuit, and / or by using a single higher rate digital service, many cost saving opportunities exist by using the present invention.

As previously explained, multipoint circuits in the DDS network use multipoint junctions units (MJU's) to combine the inbound data from each of the remote units. The MJU's basically perform a logical AND function on the primary data of the active channels in order to combine the data from the different drops when operating in the data mode as in the present invention. This principal is equally applicable to other digital networks using similar digital bridging functions. In simple multipoint operation, data from each remote does not need to be aligned in time since only one remote is polled by the Central at any given time. When the polled remote completes transmission, the next remote is polled and so on in accordance with a polling list or polling table stored at the Central site.

In a multiport multidrop operation several remotes may be polled simultaneously on different ports at any given time since the applications on different ports may not be aware of the polling condition of the other ports. This can cause collisions and errors. When secondary channel is being used in a multidrop configuration it may be active from a drop other than a drop that is currently being polled from the Central, causing more than one remote station to be active simultaneously. For these reasons, the aggregate channel frame from each one of the remotes should be aligned at the input of each MJU encountered in order for the inbound data to be combined correctly at the MJU(s) and arrive at the Central station at its proper time interval.

Figure 2:
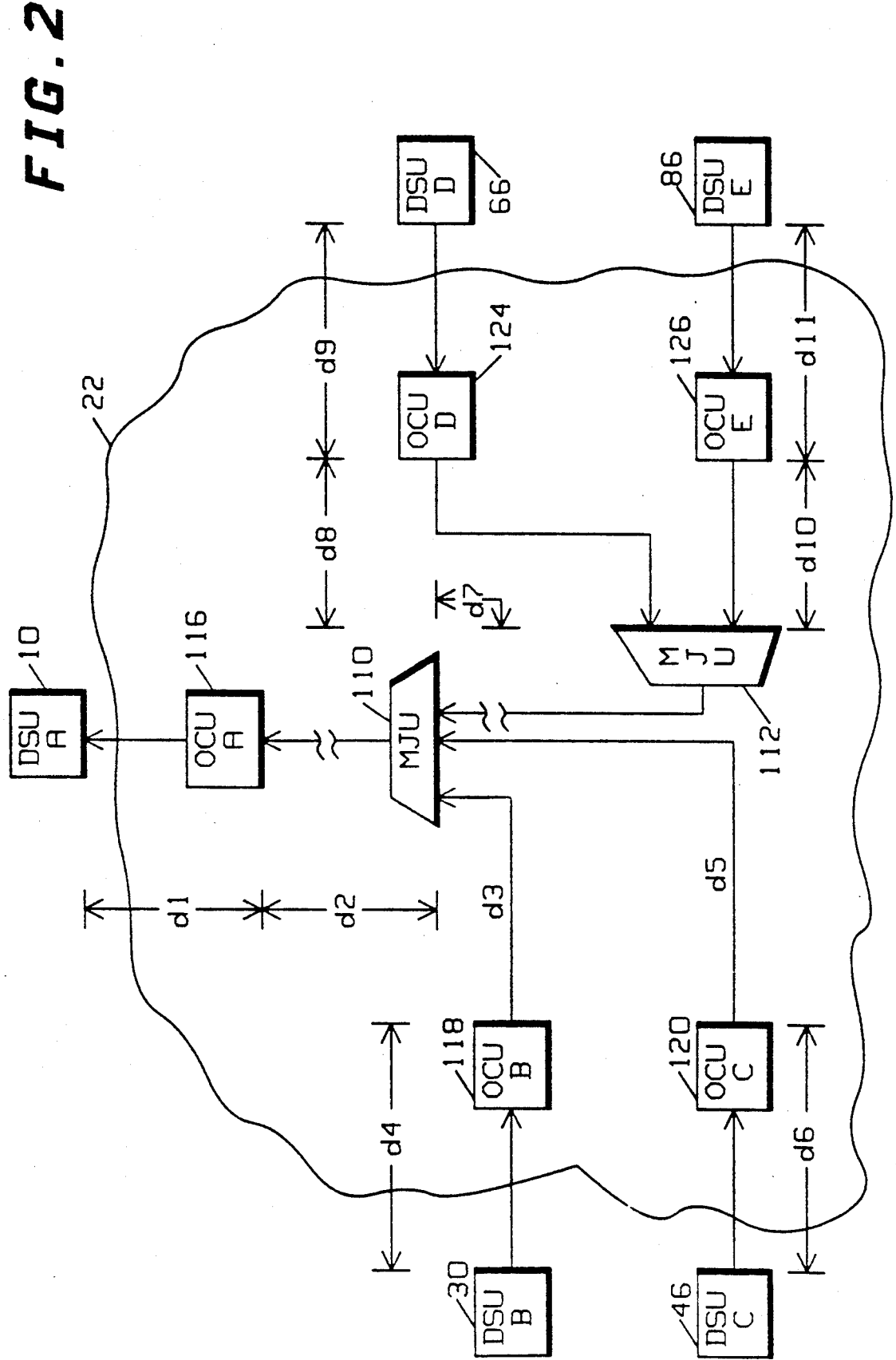
FIG. 2 illustrates a delay mechanism by which misalignment may occur in a DDS network.
Figure 3:
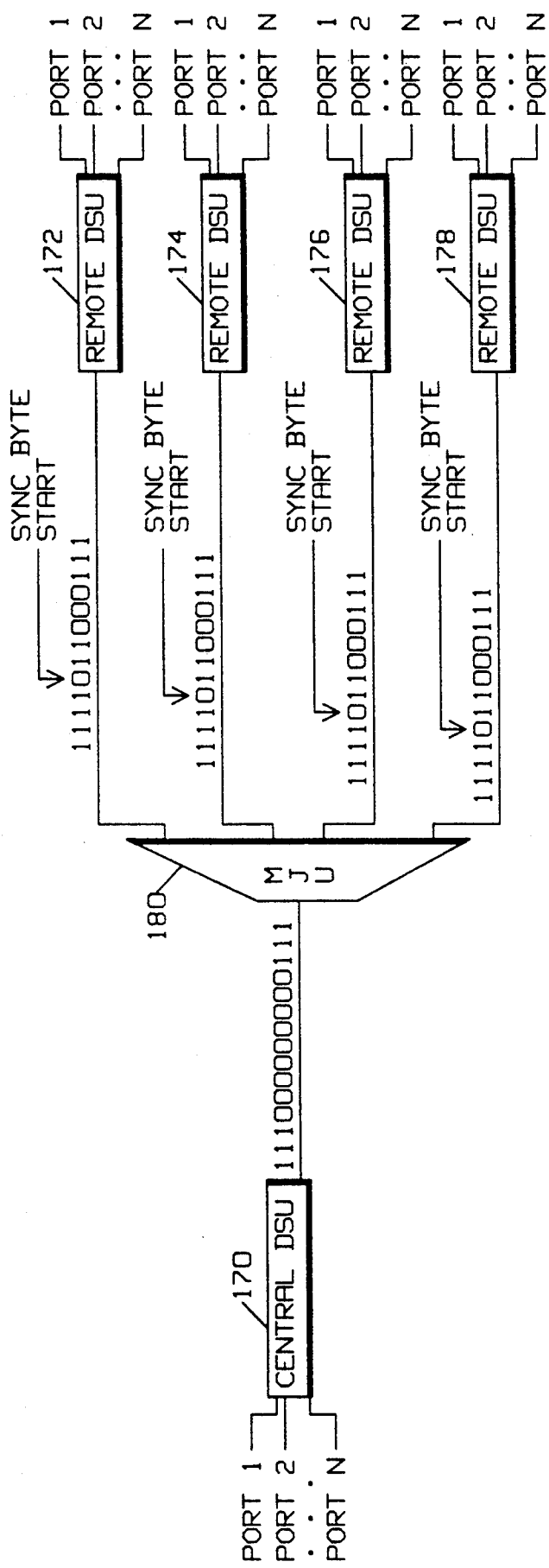
FIG. 3 illustrates misalignment of the frames at the remote units.

The operation of the Multipoint Junction Unit and the misalignment problem addressed by the present invention may be better understood by reference to FIG. 2 which illustrates one mechanism whereby misalignment, as shown in FIG. 3, can occur. In this figure, more, but not complete, detail of the network 22 is shown to illustrate the path taken by the inbound data traffic. In this sample network, two MJU's 110 and 112 are involved. Additionally, each DSU 10, 30, 46, 66 and 86 interfaces with an Office Channel Unit (OCU) respectively designated 116, 118, 120, 124 and 126.

The signals passing through the network toward the Central site are combined by the MJU's 10 and 12 which may be thought of simply as logical AND gates for purposes of this discussion since the network is operating in the data mode. Various delays may be attributed to various connections (lines) and circuits in the network for purposes of modeling the delay as shown. In most cases, the delays can be assumed to be an integer multiple of the bit time due to the elastic buffers of the synchronous network. The delay from the input of OCU 116 to the input of DSU 10 is shown as d1 and the delay from the input of MJU 110 to the input of OCU 116 is shown as d2. The total delay $d1+d2$ is common to all inbound communication in this illustrative network.

Delay d3 is attributed to the line from the output of OCU 118 to the input of MJU 110, while delay d4 is the delay from the output of DSU 30 to the output of OCU 118. Thus, the total delay from DSU 30 to DSU 10 is $d1+d2+d3+d4 = dBA$.

In a similar manner, the delay associated with the line from the output of OCU 120 to the input of MJU 110 is shown as d5. The delay from the output of DSU 46 to the output of OCU 120 is shown as d6. Thus, the total delay from DSU 46 to DSU 10 is $d1+d2+d5+d6=dCA$. Depending upon the line lengths and thus the delays d3, d4, d5 and d6, etc., this delay dBA may or may not equal dCA. The MJU 110 combines the data from DSU 30 with that of DSU 46.

The delay from the input of MJU 112 to the input of MJU 110 is given as d7. The delay associated with the connection from OCU 124 to MJU 112 is given as d8. The delay from the output of DSU 66 through the output of OCU 124 is shown as d9. Thus, the total delay from DSU 66 to DSU 10 is given by $dDA = d1+d2+d7+d8+d9$. In a manner similar to that explained above, the delay from DSU 86 to DSU 10 is given as $dEA = d1+d2+d7+d10+d11$.

Each of the above delays are, of course, inbound delays. Corresponding outbound delays are not a problem since outbound data are broadcast to all remote DSU's.

The four delays dBA, dCA, dDA and dEA may differ significantly from one another due to the various paths taken to the Central DSU 10. For simple multipoint operation, this is not critical since only one remote DSU is permitted to transmit at any given time, as explained previously. But, since the MJU's operate in a manner similar to a logical AND gate in the data mode, any such misalignment of the inbound data in a multipoint multiport environment can result in data errors.

At any one time, only one remote DTE associated with a particular application can be sending inbound data in the time slot or slots allocated to that particular application. This is because the Central polls the remote DTE's one at a time for a given application. The remaining remote DTE's send idle data bits in the form of all marks in the application's designated slot or slots. These idle data bits are then combined with the data bits from the polled DTE to produce a composite signal in which only the polled DTE signal is passed to the Central.

Simultaneously, the same thing may be occurring with other applications on the same network so that the respective time slots allocated to those applications are occupied by data from one remote DSU and idle bits from the others.

To maintain alignment for multipoint multiport requires that the delay for the DDS data bits remain constant through the DSU and the DDS network. If the delay changes in a section of the inbound data path, then the relationship of the Central unit's receive framing to its framing reference can be lost and errors can occur.

Consistent data delay through the network is assured while the network is in data mode and no situations causing errors occur. The specified network error rate for DDS can include some "timing slips" which could cause loss of framing alignment. The total error rate for DDS is specified, but the portion of this attributable to "timing slips" is not specified. Compensation for "timing slips" can be accomplished by the resynchronization methods described later.

Figure 4:
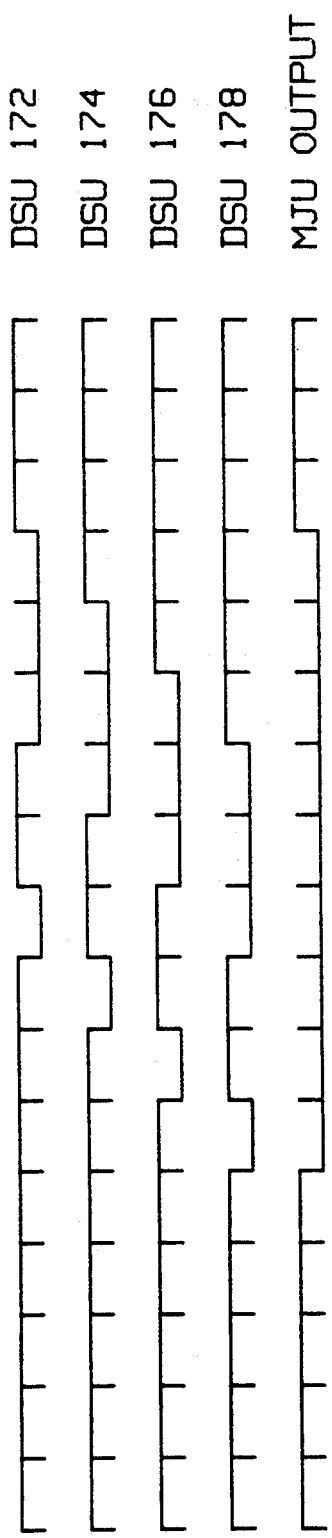
FIG. 4 is a timing diagram illustrating the misalignment or a framing pattern in the system of FIG. 3.

FIG. 3 illustrates misalignment of the frames at the remote units in a simplified example network. In this example, a Central DSU 170 broadcasts multiplexed data to four remote DSU's 172, 174, 176 and 178 through an MJU 180. The sequence of bits shown at the left of each remote DSU represents one possible sequence of misaligned data where the relative position of each bit represents its time relationship with the corresponding bits. For the outbound direction, the Central simply broadcasts the data. The inbound direction is more complex, however, since there is a possibility that the data from the various remote units may have different delays associated with their path back to the Central as illustrated in FIG. 2. This misalignment can result in collisions and data errors if not corrected. In order to prevent this, a method of compensating for the different delays in receipt of the synchronization pattern transmitted by each remote DSU is needed. This data misalignment is also shown in the timing diagram of FIG. 4 illustrating the erroneous data appearing at the MJU output as a result of the AND gate operation of the MJU.

If left uncompensated, the AND operation of the MJU 180 operating in the data mode causes a logic one to be transmitted whenever all inputs of the MJU receive a logic one. If any one or more stations transmit a logic zero, the output of the MJU will be a logic zero. As shown in the example of FIG. 3, the misalignment of the data causes four DSU's transmitting the same pattern with a total of four zeros to be combined to generate a data stream with nine consecutive zeros, an obvious error condition. Assuming that the transmission from DSU 172 represents proper timing, the composite signal shows a total of five errors in data resulting from misalignment.

The present invention takes advantage of the fact that in a DDS system, the delay through the network remains fixed when all channels are kept active (except possibly when an occasional timing slip occurs). This fact allows the Central to align each remote independently so that the combined data stream from the MJU is properly aligned. The multidrop poll field (MP POLL) of the framing scheme of the present invention is used to send control information and confirm the integrity of the aggregate channel. After an initial alignment process is complete, the integrity of the alignment is maintained by systematically polling each remote unit. If a response to the poll is not properly received by the Central, it is possible that the remote unit has lost its frame alignment. At this point the remote unit's frame is realigned if the Central determines that the remote unit is present and is capable of realignment.

The process of the present invention basically involves operating the network in the data mode and synchronizing the total DDS multiport multidrop network such that the differences in delay as measured by receipt of a transmitted frame from each remote DSU with relation to a reference stored in the Central DSU are compensated. This is accomplished by measuring the relative delay and making an adjustment (inserting a delay) in transmit time for future frames at each remote DSU to ensure that the transmitted signal arrives at the Central MJU aligned in time.

The Central MJU(s) then essentially combine(s) the signals from all of the remotes by a logical AND process in accordance with standard data mode operation. With proper time alignment, the data will be properly transmitted to the Central DSU. With this alignment accomplished, the Central then monitors the time alignment of frames transmitted from the remote stations to determine if a slip or timing change has occurred. If so, a correction of the alignment of from one to possibly all of the remote stations in the network is carried out.

This alignment process taking advantage of the network characteristics when operating in the data mode, is a basic premise of the multiport multipoint system for DDS. If all of the synchronization patterns from all remote DSU's can be made to arrive at the Central DSU simultaneously, then the remotes are aligned.

Figure 5:
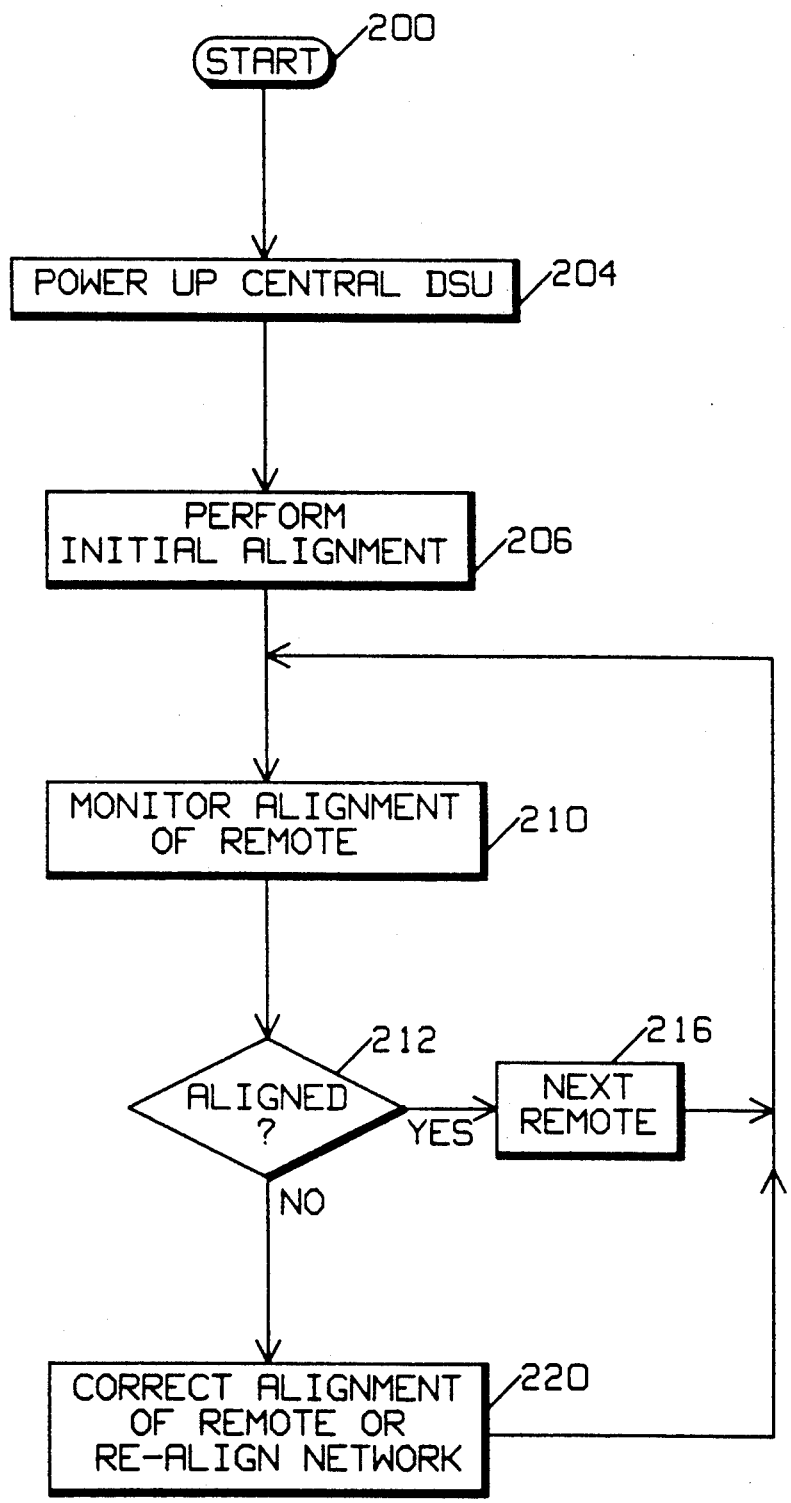
FIG. 5 shows a flow chart of an overall alignment process according to the present invention.

The flow chart of FIG. 5 describes the basic alignment and realignment process used in the present invention in general terms starting at 200. At step 204 the Central DSU is powered up. Control then passes to step 206 where an initial alignment process is carried out to obtain alignment of inbound transmission from all remotes. Next, at step 210, the alignment of a remote (preferably the first remote on the Central DSU's polling list) is inspected to determine that the alignment of this remote is intact. If it is properly aligned at 212, control passes to 216 where the Central increments to the next remote station and control returns to step 210 where alignment of this next remote station is inspected.

If any remote is determined to not be properly aligned at 212, control passes to 220 where a correction is made, if possible, to the remote that is misaligned. If it appears that more than one remote station is involved (e.g. power failure at a remote facility or network problem) a complete realignment is performed for the entire system at 220. Control then returns to the monitoring step 210.

The measurement process for measurement of the actual delays is carried out by comparison of receipt time in the Central DSU of the framing pattern with a frame and bit counter within the Central DSU. This counter keeps track of the incoming frames from the remote stations. For example, if a frame is 144 bits long, the counter will count from 0 to 143 and then reset and repeat the count. The Central station knows that the first bit of the frame should arrive when the counter is at 0. If in fact the first bit of the frame arrives at count 25, then the delay associated with the transmitting remote DSU is 26 clock counts. This information is conveyed to the remote in question who then delays transmission or stretches it's next transmitted frame for 144−26=118 clock counts so that the next frame it transmits will be properly aligned. This counter can, of course, be implemented either with a hardware counter or in software or firmware.

Figure 7:
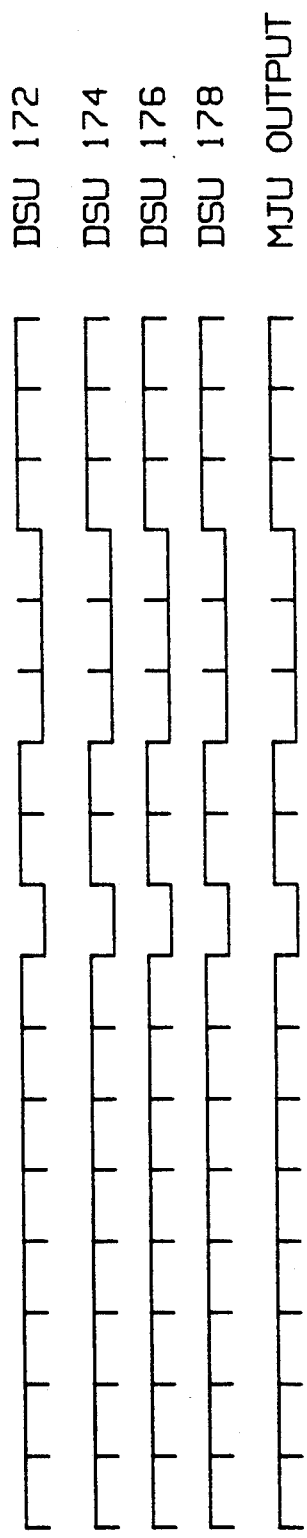
FIG. 7 is a timing diagram illustrating the proper alignment of the framing pattern in the system of FIG. 6.
Figure 6:
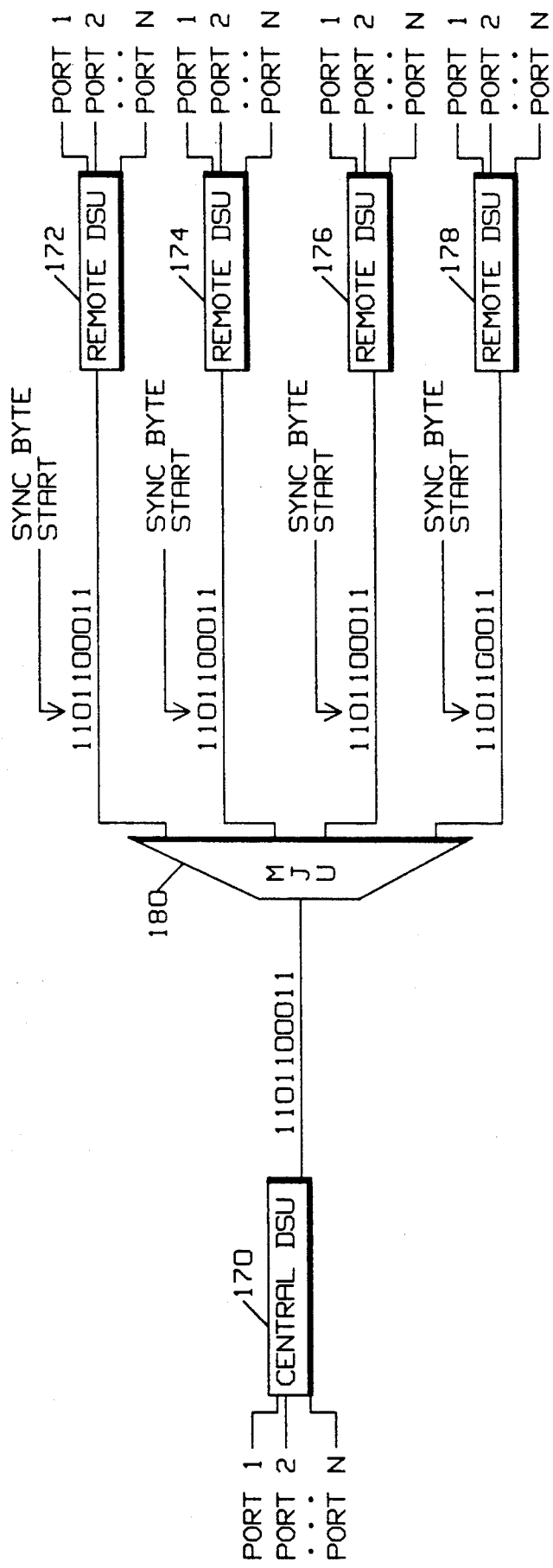
FIG. 6 illustrates proper alignment of the frames at the remote units.

Once this alignment or re-alignment process has been completed, the transmission time of the remote units will be properly coordinated so that transmitted frames as received by the Central DSU and the input of any digital bridge is properly aligned in time. FIG. 6 illustrates proper alignment of the frames at the remote units in the simplified network of FIG. 3. This proper alignment of data results in the proper combined data output from MJU 180 as illustrated by the timing diagram of FIG. 7. In this FIG. 7, the framing pattern being transmitted by each DSU 172, 174, 176 and 178 is properly aligned in time so that no data errors are introduced when data are transmitted.

Figure 8A:
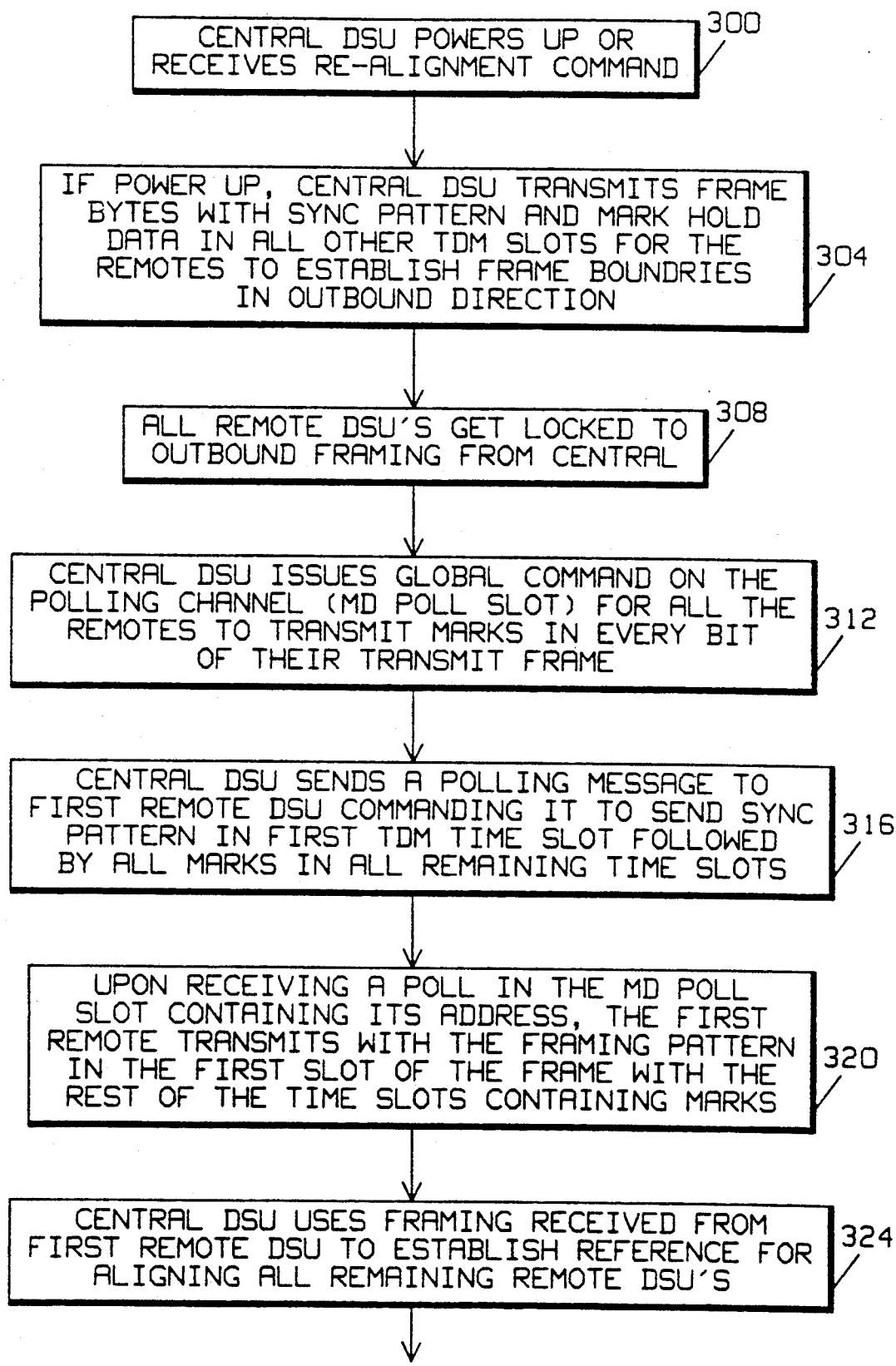
FIGS. 8A and 8B describe the alignment process of the present invention in greater detail.
Figure 8B:
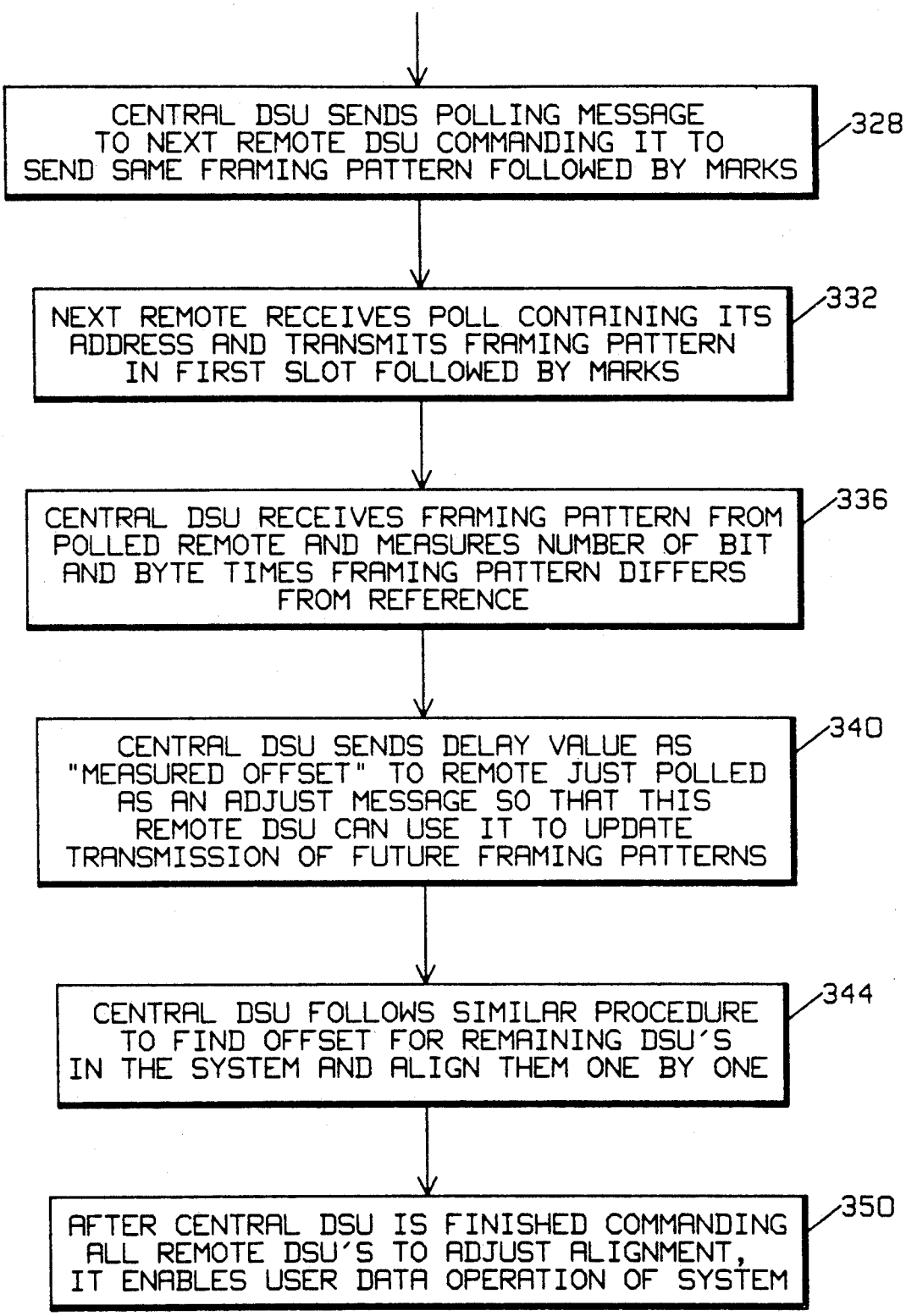

Turning now to FIG. 8, the present alignment process is described in greater detail. The process of alignment of the network can be initiated by either power up of the Central DSU or by receipt of a command issued by a network manager to re-align the network. When one of these events occur at 300, the Central DSU transmits frame bytes with a sync pattern in the first time slot and mark hold data (all logic ones) in the other frame slots to establish the frame boundaries (if the alignment was initiated as a result of power up of the Central DSU at 304).

If the alignment was the result of a re-align command at 300, step 304 is unnecessary. Control then passes to 308 where remote DSU's get locked to outbound framing from the Central DSU. At step 312, the Central DSU issues a global command (addressing all remote DSU'S) on the polling channel (MD POLL, to be explained later) for all the remote units to transmit marks in every bit of their transmit frame. Then, at 316, the Central DSU sends a polling message to a first of the remote DSU's commanding it to send the Sync pattern followed by all marks in the frame. (The first DSU can be chosen, for example, as the DSU having the lowest or highest address.)

Upon receiving the poll in the control channel containing the remote unit's address at 320, the first remote transmits with the framing pattern in the first time slot of the frame with the rest of the frame's time slots as all marks. At 324, the Central DSU uses this framing received from the first remote DSU to establish a reference time at the Central for aligning the remaining DSU's. After this, the Central commands the remote to return to sending all marks. The Central DSU then sends a polling message to the next remote DSU commanding it to send the same framing pattern followed by marks as was transmitted by the first DSU at step 328. Control then passes to 332 where the next remote, upon receiving a poll in its control channel containing its address, transmits the same pattern which was transmitted by the first DSU to the Central.

At 336, when the Central DSU receives this framing pattern from the polled remote DSU, it compares it with the timing of the framing pattern received from the first DSU. The Central DSU measures how many bit and byte times this framing pattern differs from the reference established by the timing of the first DSU. At 340, the Central DSU sends this delay value as a "measured offset" to the remote which was just polled as a message telling this remote DSU how much delay it should introduce prior to future transmissions so that the timing will align with that of the reference stored in the Central DSU. To implement this delay, the frame bit counter in the transmitting DSU is merely adjusted so that one frame is in essence either stretched or shortened.

This process defined by steps 328, 332, 336 and 340 is then repeated as many times as necessary to find appropriate "measured offset" values for each remaining remote and transmit such values to all remotes in step 344. After the Central DSU is completed establishing the offset for each remote DSU and transmitting the "measured offset" value to each remote DSU, the system is then enabled to receive user data at 350.

The addresses which are used to address the various DSU's are preferably the same addresses as those used for diagnostic and control functions for the DSU. This is not to be limiting since any appropriate addressing scheme may be used. In one embodiment, these are addresses compatible with the commercially available Racal-Milgo CMS TM series of network management system such as described in U.S. Pat. No. 4,3385,384 to Rosbury, et al which is hereby incorporated by reference.

Figure 9:
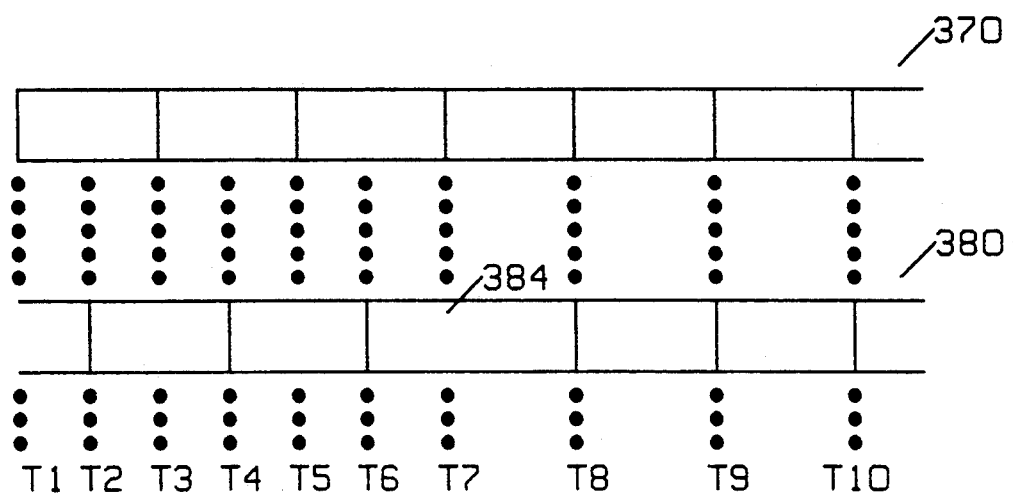
FIG. 9 illustrates the process of stretching a frame to achieve alignment.

The transmit frame adjustment is illustrated in FIG. 9 in which 370 represents a stream of frames aligned to the reference and 380 represents a stream of frames being aligned to this reference. Both streams of frames are viewed as received at the Central DSU with time T1 occurring prior to time T2, etc. At times T1 through T7 the frames are out of alignment as indicated by the lack of time alignment of the vertical lines representing the frame boundaries. Frame 384 of stream of frames 380 begins at time T6 and is extended by an amount of time equal to T7−T6 which is the amount of difference in the delay between the two streams of frames. By so extending or stretching frame 384, both streams of frames 370 and 380 merge into time alignment at time T8 after which each frame boundary aligns at times T8, T9 and T10, etc. In a similar manner, frame 384 could have been reduced in length in many circumstances so that proper alignment occurred at time T7.

In alternative embodiments of the above system, the exact order of the steps may be rearranged somewhat or the process may be modified. For example, each of the remote stations may be polled and timing measurements made prior to sending any correction information in the form of the "measured offset" to the remote DSU's. This might permit a reduction in the time required to align a network in which many of the remote DSU's are already in time alignment since their aligned frame times could be adopted as a reference thus avoiding need to transmit correction information to the already aligned remote. Other arrangements will occur to those skilled in the art.

As discussed briefly in connection with FIG. 5, once proper alignment has been attained, data can be transmitted without collision unless one or more of the remote units loses alignment. This can occur due to power outages, network errors, or other factors which might result in a change in the amount of delay at one remote relative to the delay for which the alignment corrected. This problem can be corrected in one of several ways. The initial alignment process of FIG. 8 can be repeated or the method shown in FIG. 10 can be used in an attempt to minimize the time that the system is unavailable to the user.

Figure 10:
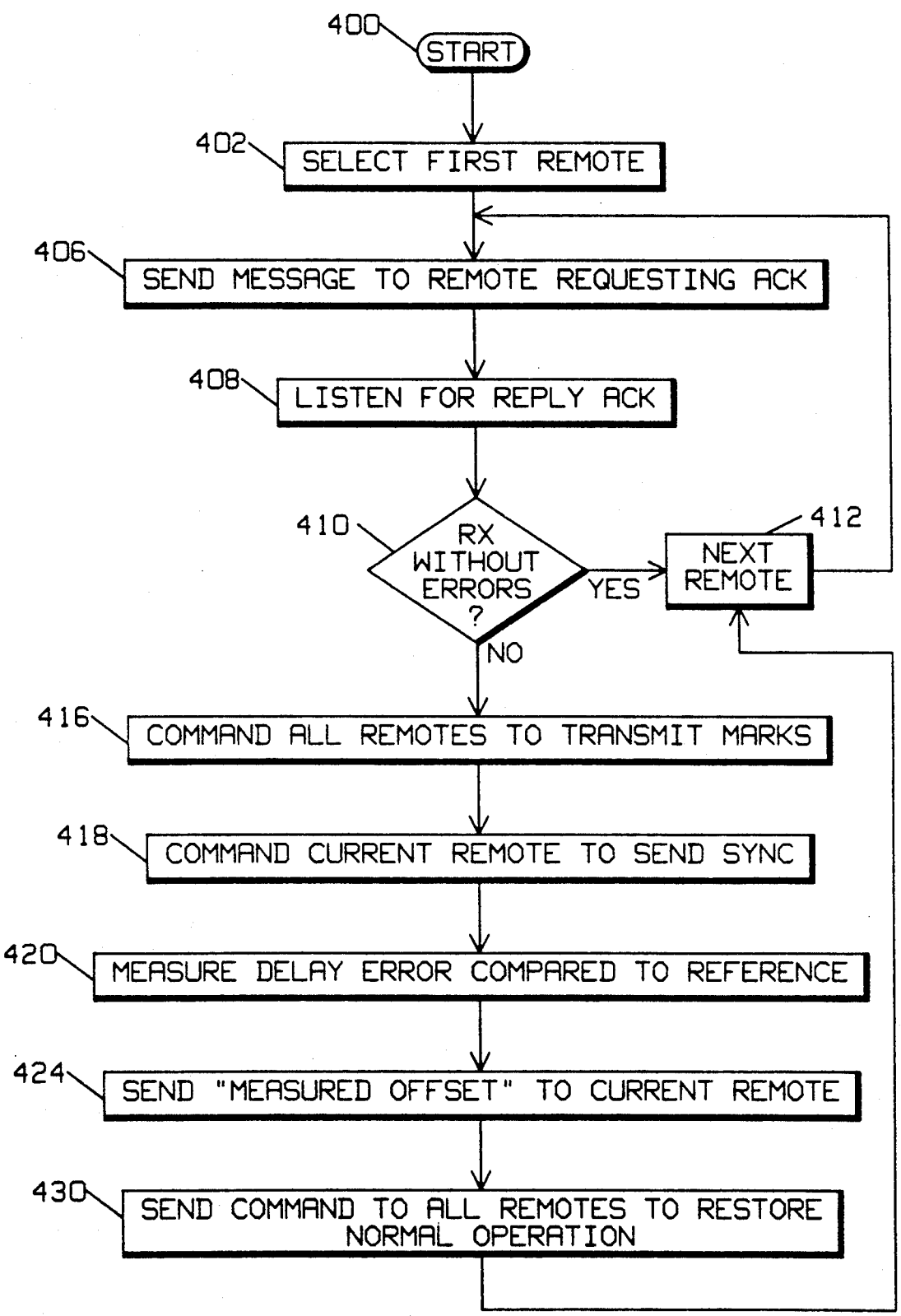
FIG. 10 describes the process of re-alignment of a single misalignment remote station.

Turning to FIG. 10, a method for alignment correction is described in general terms followed by a more detailed description of the process. This is an ongoing process of monitoring the status of each drop to determine that each drop is in proper synchronization. By using such a correction method, timing slips in a single channel or other disruptions of proper timing can be corrected. The processes starts at 400 and a first remote station is selected at 402. The Central sends a message (a poll) to the selected remote at 406 requesting that the selected remote return an acknowledgement of the message. The Central then listens for the acknowledgement at 408. If, at 410, the Central receives the acknowledgement and the acknowledgement is error free, the next remote is selected at 412. When the last remote is checked, the first remote is the next remote so that the process continuously repeats.

The Central looks for errors in the acknowledgement to determine whether or not a remote is properly aligned. To allow for communication errors, the Central does not assume that a remote is misaligned or down unless it has transmitted two consecutive unanswered polls. The Central waits after each poll for a predetermined time period to obtain a response. If this time period expires on two consecutive polls or if errors are obtained on two consecutive polls, the remote is assumed to be down or misaligned.

If a misalignment is detected, control passes to 416 where the Central commands all remote stations to transmit all marks. Next, the Central assures itself that the remote station is present before any steps are taken to extensively shut down the flow of user data. This is done by the Central commanding the remote in question to transmit a sequence of spaces (zeros, in the preferred embodiment it will transmit one frame plus one slot of zeros). This pattern is guaranteed to get through to the Central if the network is functioning properly since zeros pass through the MJU without regard for the signals on the other channels due to the AND operation of the MJU. If this is not received by the Central, the Central can be sure that the remote is not on line.

Then, at 418, a resynchronization of the current remote is initiated by commanding the current remote to send a sync pattern. At 420, the sync pattern is received by the Central and the delay error is measured with relation to the reference frame established during the initial alignment procedure. The "measured offset" value is then transmitted back to the current remote at 424 and then, at 430, the Central commands all remotes back on line to restore normal operation. Control then returns to 412 where the next remote is selected for verification. Other methods may also be devised to correct for an error in a single remote station.

The above is, of course, a simplified description of the process. A more detailed discussion of the realignment process of the preferred embodiment is as follows.

As previously discussed, after the Central has synchronized all the remote stations in the poll table and brought customer data on line there is still a requirement for synchronization of remote. A remote unit can be in an unsynchronized state for many reasons. These include line slips affecting a remote, temporary power failure at a remote, plugging in a new remote to a live network and changing a unit's address. Because of this requirement the Central needs to periodically check on the synchronization of all units in the poll table and resynchronize them if needed or remove them from the poll table if they are no longer present. The Central also needs to check on all the remaining diagnostic addresses to allow initial entry of units into the poll table as well as re-entry of remote stations into the poll table after they were removed because of previous problems.

The Central periodically polls each remote in the poll table. it will also poll all the other possible diagnostic remote unit addresses. This polling is done using an "MD Poll" channel within the multiport frame. In order to provide a quick response time to the known units in the poll table a specific polling order will be used. The polling process starts with the Central sequentially polling each unit in the poll table and then poling one remote from the remaining address of available legal diagnostic addresses (256 addresses are available in the preferred embodiment). Next, the Central again sequentially polls each unit in the poll table and then polls the next diagnostic address. This continues until all of the remaining diagnostic addresses have been polled and then the polling process starts over. This ensures that only one remote unit that is not in the poll table is polled between successive polls of a unit in the poll table.

When the Central polls a unit that is in the poll table it expects an acknowledge message in the MD POLL channel from that remote. The arrival of this message in the MD POLL channel timing slot of the multiport frame verifies that the remote has proper frame alignment. Up to two successive polls will be issued to the remote to allow for communication errors. If after a timeout no reply is received, then this information should be used in a integration process to detect problem units, the remote will not be removed from the poll table at this time. The integration process should determine that a remote in the poll table has not responded to polls for a certain time period and then cause it to be removed from the poll table. The timeout should be on the order of the time required for a unit to power-up and lock onto the Central transmit framing. This allows a quick recovery time for remotes that experience problems up to the severity of a momentary power interruption. Since they are not removed from the poll table, they will receive a poll message frequently which allows them to go through the resynchronization sequence.

A simple timing slip can be corrected by instructing a remote to transmit a predetermined pattern in the MD POLL field of the frame and determining if the pattern is either one bit too fast or slow. The preferred pattern is a space surrounded by marks. For the preferred four bit slots, a 1011 or 1101 pattern can be used. The Central can then check to see if this pattern is off by a single bit time. If so, the Central then commands the remote to adjust its timing accordingly. If this adjustment process fails, the other approaches discussed herein can be used.

After the Central has polled a unit in the poll table and the remote replies, or 2 polls and timeouts are completed, then polling commences at the next remote. The Central first tries once more to contact the remote by sending a command to transmit a sequence of zeros to see if the remote is present before commencing polling. The remote, upon receiving a poll to its address, sends a reply in the poll channel if it has an internal "in-sync" flag set. The "in-sync" flag is used to indicate a condition of proper frame alignment and is set during the alignment or realignment process. If the "in-sync" flag is not set, the remote sends a special sequence to the Central that is guaranteed to be received by the Central even if the remote does not have its transmit framing synchronized. This message sequence, for example, consists of X consecutive multiport time slot bytes transmitted as all zeros, where X is one greater than the number of time slot bytes in the multiport frame. The data pump has the responsibility of detecting this message by detecting X−1 consecutive all zeros bytes. If the Central receives this sequence during the time it is waiting for the reply from the remote it begins a synchronization procedure for that remote. This begins with the Central issuing a global command to all remotes to transmit a mark in every byte slot in their frame. This command should preferably be issued twice in two consecutive frames to assure that the command is received by all remotes even in the event of a communication error. Upon receipt of this command, data are of course interrupted. This fact is communicated to the controller (system control processor 545 of FIG. 11) so that the DTE data ports can be notified that data flow is being interrupted.

The Central continues its synchronization session with the remote by issuing a command to the remote for it to transmit one frame with the framing pattern in the first time slot of the frame and with the rest of the time slots transmitted as all ones. The Central waits up to a specified timeout for a frame byte from the remote. If after the timeout the frame byte is not received the Central reissues the command once. If the frame byte is not received after a second timeout the polling commences at the next diagnostic address in the poll table. In this case of no response the unit's diagnostic address is passed to an integration process which will cause the unit to be removed from the poll table if it continues to not respond to requests. If a frame byte is received, the Central measures how many bit and byte times this is off from the reference receive framing.

This "measured offset" value is sent in an adjust (ADJ) message to the remote for it to use to update its transmit framing. When the remote receives the adjust message it adjusts its transmitter by the amount specified in the message and transmits all ones in the frame. After the Central has transmitted the adjust message the Central verifies the synchronization by sending the remote a command to set its "in-sync" flag and for it to transmit an acknowledge in the MD POLL channel. The Central repeats this sequence up to 2 times if timeouts occur due to no response. If no response is received from the remote, a message will be sent to it to clear its "in-sync" flag. The unit's address will not be removed from the poll table at this time, but is passed to a background integration operation. This integration operation is responsible for removal of the addresses from the poll table if it determines that it is appropriate to do so by virtue of the unit failing to respond a predetermined number of times in a given time period (integration threshold). This integration threshold can be determined experimentally.

The remote should integrate the number of failed resynchronization attempts. If the number exceeds a predefined integration threshold, then the remote will automatically squelch itself and generate the appropriate alarms (Maydays). This will prevent a noisy line or malfunctioning unit from repeatedly bringing down user data.

After the Central is finished with the synchronization session for that remote it enables user data operation. This is done by sending a global enable transmitter command called SMD (Switch to Data Mode) from the Central, twice for reliability, which causes all remote stations with their "in-sync" flags set to renew transmission of multiport framing and data.

A remote is removed from the poll table when there is an indication of an abnormal condition at that remote.

To prevent this remote station from continuously disrupting user data, the remote should preferably keep statistics on its problems and independently act on them in the preferred embodiment. It is particularly advantageous for the remote to keep statistics on how often the Central is trying to align its framing. If the number is excessive (greater than a predetermined threshold) the remote issues a Mayday to this effect to the network management system and also squelches all transmission. This prevents an intermittent remote from demanding frequent framing realignments which require interruption of all network user data.

The operation when a Central polls a diagnostic address that is not in the poll table is almost the same as described above for a remote that is in the poll table. There are several differences however. First of all the Central does not expect a poll reply by the remote in the MD POLL channel. Rather, it only expects the long sequence of zeros message if a remote is present at the polled address. Just as for the remote units in the poll table, the Central should wait a timeout period, long enough to receive an all zeros message from the remote 7 bit bytes, 0110001 is used and for 6 bit bytes, 011000 is used, but this is not to be limiting. The MultiDrop Poll (MD POLL) is used to control and confirm the integrity of the frame alignment as will be described more fully later. The Secondary Channel (SEC CH) field is used to provide for a diagnostic secondary channel or may be used for other purposes. The data fields (D1, D2, D3 ... Dx) contain primary channel data. Of course, those skilled in the art will appreciate that while this arrangement is preferred, it is not intended to be limiting as other arrangements of the frame are possible. Also, the same framing can be used for point to point multiport arrangements.

The preferred framing is arranged so that the data fields provide commonly used data rates for data communications (e.g. 1200, 2400, 4800, etc.) although this is not intended to be limiting. This is accomplished by appropriately selecting the byte length and frame length to provide for even division by 1200 bps. Table 2 below shows the preferred frame designs for some of the various DDS-I services currently available; other arrangements will occur to those skilled in the art:

TABLE 2

| SERVICE | FRAME SLOTS | BITS SLOT | SEC CH SLOTS | SEC CH RATE (KBPS) | DATA SLOTS | 1200 BPS DATA CHANNELS | MD POLL SLOTS |
|---|---|---|---|---|---|---|---|
| 56K | 140 | — | 6 | 2.4 | 132 | 132 | 1 |
| 38.4K | 96 | 6 | 4 | 1.6 | 90 | 30 | 1 |
| 19.2K | 48 | 6 | 1 | 0.4 | 45 | 15 | 1 |
| 9.6K | 24 | 6 | 1 | 0.4 | 21 | — | 1 | requesting resynchronization, before it proceeds to poll the next remote. The remainder of the preferred alignment process is preferably identical with one exception. If the Central has successfully aligned the remote it should also preferably enter the remote address into the poll table.

The present invention can be implemented in either the DDS-I or DDS-II (basic DDS or DDS-S/C) or other compatible or similar synchronous digital services using outbound broadcast and digitally bridged inbound (i.e. use of an AND function or similar to combine inbound data). Currently, the most prevalent of such systems are the DDS networks, but this is not to be limiting since the present invention will potentially work with other similar systems.

The present invention may be implemented in a number of ways, as will be clear to those skilled in the art. In order to implement the preferred embodiment of the present invention in a DDS network, a frame structure is imposed upon the data as shown in the following Table 1:

TABLE 1

| SYNC | MD POLL | SEC CH | D1 | D2 | ... | Dn |

In this embodiment, the frame structure allows for a SYNC field to carry the synchronization pattern which is used to identify the start of the frame and to maintain synchronization and alignment, an MD POLL field which makes up the MD POLL channel to carry the polling and alignment related commands, a secondary channel field for use in providing secondary channel control and diagnostics, and a plurality of data fields for user data. The first field (SYNC) is a sync pattern field which carries a sync character which marks the start of a frame and is used by the receiving unit to establish frame boundaries. For 8 bit bytes, 01100010 is used, for Although the data channels are expressed in Table 2 in terms of number of 1200 BPS channels available, it will be clear to those skilled in the art that this should not be construed as limiting the channels to 1200 BPS. For example, in the case of 56 K DDS service, 22 channels of 2400 BPS or 11 channels of 4800 BPS could also be provided. Similarly, 11 channels of 2400 BPS and 22 channels of 1200 BPS could be provided or other variations of the available bandwidth can be devised. As disclosed, each byte of the frame represents 400 BPS so that other bandwidth allocations are also possible.

In the case of DDS-II, a similar framing scheme can be used according to one embodiment. However, DDS-II has its own frame structure imposed by the network definition. Table 3 below shows the subrate DDS-SC frame format. In this Table, D1–D6 represents six data bits per frame, F represents a framing pattern bit and S/C represents a shared secondary channel and control bit. The framing pattern used is a repeating 101100 pattern. For 56K DDS S/C, the same frame format is used except for the addition of a D7 bit (seventh data bit after D6 and before F Bit).

TABLE 3

| D1 | D2 | D3 | D4 | D5 | D6 | F | S/C |

For each of the DDS services (DDS-I and DDS-II), multiplexing can be accomplished by a number of different techniques. In general, however, time slots must be allocated in some way to particular channels as with the divisions shown in Table 2.

In a simpler embodiment of the present invention which still takes advantage of the network's operation in the data mode, channel allocation and frame alignment, may be done by simply using the DDS-S/C frame alone without imposing a separate frame structure. In this simpler embodiment, the network automatically provides frame alignment and an alignment process is unnecessary. However, this simpler embodiment has several inherent restrictions. By being restricted to the DDS-S/C frame structure, allocation of channels is less flexible than the other embodiments due to the small frame size and it is more difficult to allocate channels in standardized increments. Also, this embodiment is only usable for the DDS-S/C service, and their equivalents, which are currently not as widely available.

This simpler embodiment does have several important advantages over the other more complex embodiments, however. The implementation is much simpler and there is no need for a frame alignment or realignment process since the framing is provided by the system. As an example of this simpler system, consider again Table 3. Using DDS-S/C 9.6Kb service, the frame can be divided into, for example, two 4.8Kbps channels to make a two port multiport multipoint DSU. For example, bits D1, D2 and D3 can be assigned to a first port and bits D4, D5 and D6 can be assigned to a second port. Alternatively, alternating bits can be assigned to alternating ports or any other suitable combination can be made to provide two 4.8Kbps channels.

In any case, the inactive ports from other remote DSU's transmitting inbound data operate identically to their operation in the other embodiments described. Namely, they transmit all marks in place of data bits while not transmitting data. Thus, the MJU's of the network operate identically in the data mode by combining data from the various remotes by ANDing the bits together to create a composite signal. Other possible port combinations will occur to those skilled in the art. Of course, when using this embodiment, the basic limitation in allocation of bandwidth is that the bandwidth can only be assigned in multiples of one sixth of the service rate for subrate service and one seventh of the service rate for 56K service due to the number of bits in the service defined frame. (Similar limitations would apply to other services using different frame sizes.)

This limitation in the DDS-S/C embodiment can be overcome to a degree by using rate adaption techniques. For subrate services, standard data rates can be achieved by assigning the bandwidth in ¾ bit increments. For example, for 9.6Kbps service three channels could be assigned as follows. The first channel could be assigned ¾ of the bandwidth of one bit to obtain a 1200

TABLE 4

| D1 | D2 | D3 | D4 | D5 | D6 | F | S/C |
|----|----|----|----|----|----|---|-----|
| F1 | F2 | F2 | CH3 | CH3 | CH3 | 1 | S/C |
| F1 | CH2 | CH2 | CH3 | CH3 | CH3 | 1 | S/C |
| CH1 | CH2 | CH2 | CH3 | CH3 | CH3 | 1 | S/C |
| CH1 | CH2 | CH2 | CH3 | CH3 | CH3 | 1 | S/C |
| CH1 | F2 | F2 | CH3 | CH3 | CH3 | 1 | S/C |
| CH1 | CH2 | CH2 | CH3 | CH3 | CH3 | 1 | S/C |
| CH1 | CH2 | CH2 | CH3 | CH3 | CH3 | 1 | S/C |
| CH1 | CH2 | CH2 | CH3 | CH3 | CH3 | 1 | S/C |

The framing bits F1 and F2, which can be for example spaces or a pattern other than all marks, are only transmitted when the remote port CH1 is active. Otherwise, marks are transmitted. The Central locks onto the framing pattern F1, for example, to find the beginning of the Channel 1 data and to assure that the Central remains locked to the data to perform the rate adaption correctly. Whenever a different remote port begins transmitting, the Central relocks to the F1 framing pattern. Similar statements apply to CH2 and F2. Channel CH3 requires no framing since no rate adaption is needed.

For DDS-I, there is no network imposed frame as above for DDS-II. Instead, control information is communicated using bipolar violations. Thus, in order to provide for separate channels in DDS-I, a frame structure is imposed by the DSU upon the data in any suitable manner to appropriately divide up the available bandwidth. In the preferred embodiment, the aggregate channel is partitioned into a plurality of sequential time slots and a frame is imposed upon the data.

To implement the present invention in a DDS-II network, the present invention uses essentially the same scheme as that of DDS-I. In so doing, the frame structure imposed by the network is simply transmitted within the DDS-II frame's data area as required by the network with every byte of the frame of the present invention occupying a single DDS-II frame. Thus, each slot of the frame of the present invention will contain a Frame bit, and a S/C bit which are transmitted to satisfy the network requirements. The secondary channel function provided by the network may be used if desired for it's intended purpose. However, in the preferred embodiment, additional secondary channel bandwidth is allocated. The preferred frame structure for some of the presently available DDS-SC services is shown in Table 5 below.

TABLE 5

| SERVICE | FRAME SLOTS | BITS/SLOT | SEC CH SLOTS | SEC CH RATE (KBPS) | DATA SLOTS | 1200 BPS DATA CHANNELS | MD POLL SLOTS |
|---------|-------------|-----------|--------------|--------------------|-----------|-----------------------|---------------|
| 64K | 160 | 8 | 14 | 5.6 | 144 | 48 | 1 |
| 56K | 140 | 7 | 6 | 2.4 | 132 | 44 | 1 |
| 38.4K | 96 | 6 | 4 | 1.6 | 90 | 30 | 1 |
| 19.2K | 48 | 6 | 1 | 0.4 | 45 | 15 | 1 |
| 9.6K | 24 | 6 | 1 | 0.4 | 21 | 7 | 1 | bps channel. A second channel could be assigned ¾ of the bandwidth of two bits to obtain a 2400 bps channel. A third channel could be assigned the bandwidth of three bits to obtain a 4800 bps channel. The remaining bandwidth can be use to provide framing information by transmitting data in eight bit bytes. This is illustrated by the following Table 4 illustrating a data pattern for eight consecutive DDSS-S/C frames. In this table, bits allocated to the three channels above are designated CH1, CH2 and CH3 respectively.

The following Table 6 illustrates the preferred format for the MD POLL field of the frame of Table 1 which is used to convey the polling and control information used in implementing the present invention. Of course, those skilled in the art will appreciate that this protocol is not to be limiting since any number of appropriate protocols for conveying the appropriate commands can be used.

TABLE 6

| U2 | U1 | OP | D/C | MP3 | MP2 | MP1 | MP0 |
|---|---|---|---|---|---|---|---|

The above format is applicable to any of the DDS-I or DDS-II type formats. The byte size depends upon the service, e.g.: 8 bits for Clear Channel 64K service, 7 bits for 56K service and 6 bits for subrate services. The U1 character is available only for the 64K or 56K (eight and seven bit byte) services and the U2 character is available only for the 64K service (eight bit byte). The MP0-MP3 bits form a four bit nibble (MP nibble) of the protocol's data or command. Two consecutive nibbles make up a byte. The D/C slot is used as a flag to indicate whether the MP nibble contains a command or data. The OP field is the odd parity of the MP nibble which is used in a conventional manner for error checking. When the U1 field is available, it is also filled with the odd parity of the MP nibble. When the U2 field is available, it is filled with the even parity of the MP nibble. Messages are transmitted by use of a string of MP nibbles to make up a complete message. Each nibble is referred to below as a field in the command structure.

In the preferred embodiment, each complete message begins with a command field CMD having the D/C flag set to zero (indicating a command rather than data). There are three types of messages supported: normal message, global message and data message. A global command contains only the CMD field. A normal message contains a CMD field followed by two address fields (high and low nibbles of an eight bit address). The format of a data message is a CMD field followed by two address fields as above, followed by a plurality of data fields. A reply field follows for response from the remote to the Central.

The following Table 7 types of commands can be issued in the current form of the above protocol, but others can be added for other purposes as required:

TABLE 7

| COMMAND | DESCRIPTION |
|---|---|
| SWI | SWITCH TO IDLE |
| EFS | ENABLE FRAME SEARCH |
| SAP | START ALIGNMENT PROCESS |
| ADJ | ADJUST |
| SDM | SWITCH TO DATA MODE |
| MP | MAINTENANCE POLL |
| SS | SEND SPACE |
| CIS | CLEAR IN-SYNC |

The SWI command is sent to the remotes to place them in the idle mode to send all marks to the Central. This command is sent to the Central at either the beginning of the initial alignment process, after a power on condition or when subsequent alignments are required. The EFS command is sent to one remote requesting it to send frames so that the Central is able to obtain a frame reference. The SAP command is sent to a particular diagnostic address to instruct the remote to send one frame with all ones in the data field and with a synchronization pattern in the SYNC field so the Central can find determine the proper "measured offset". The ADJ command is sent to a specified diagnostic address to set the "in-sync" flag of the remote and for the remote to adjust the transmit frame using the offset in the data field of the command.

The SDM command is a global command sent to enable remotes with "in-sync" flags which are set to begin transmitting user data. The MP command is used to poll the remotes to verify that they are in alignment during the online alignment maintenance process. A reply message is sent by the remote in the MD Poll field, to acknowledge reception of the poll. A new remote station on the network sends a frame of all zeros in response to the MP and is thus identified by the Central. Of course, this all zero frame may corrupt data on the line.

The SS command is used to command a remote to send a frame of all spaces plus one slot time of additional spaces so that it can be positively identified as a response by the Central. Although the frame data fields can possibly contain all zeros, the frame sync pattern cannot so this pattern of all zeros is sure to be recognized by the Central as a response. The CIS command is used by the Central to command a remote to clear its "in-sync" flag. The CIS command can be either a normal command or a global command.

While the above protocol for communication using the MD Poll slot is suitable for implementation of the present embodiment, it will be clear to those skilled in the art that other protocols may be equally suitable. The present protocol may thus be varied without departing from the present invention.

Figure 11:
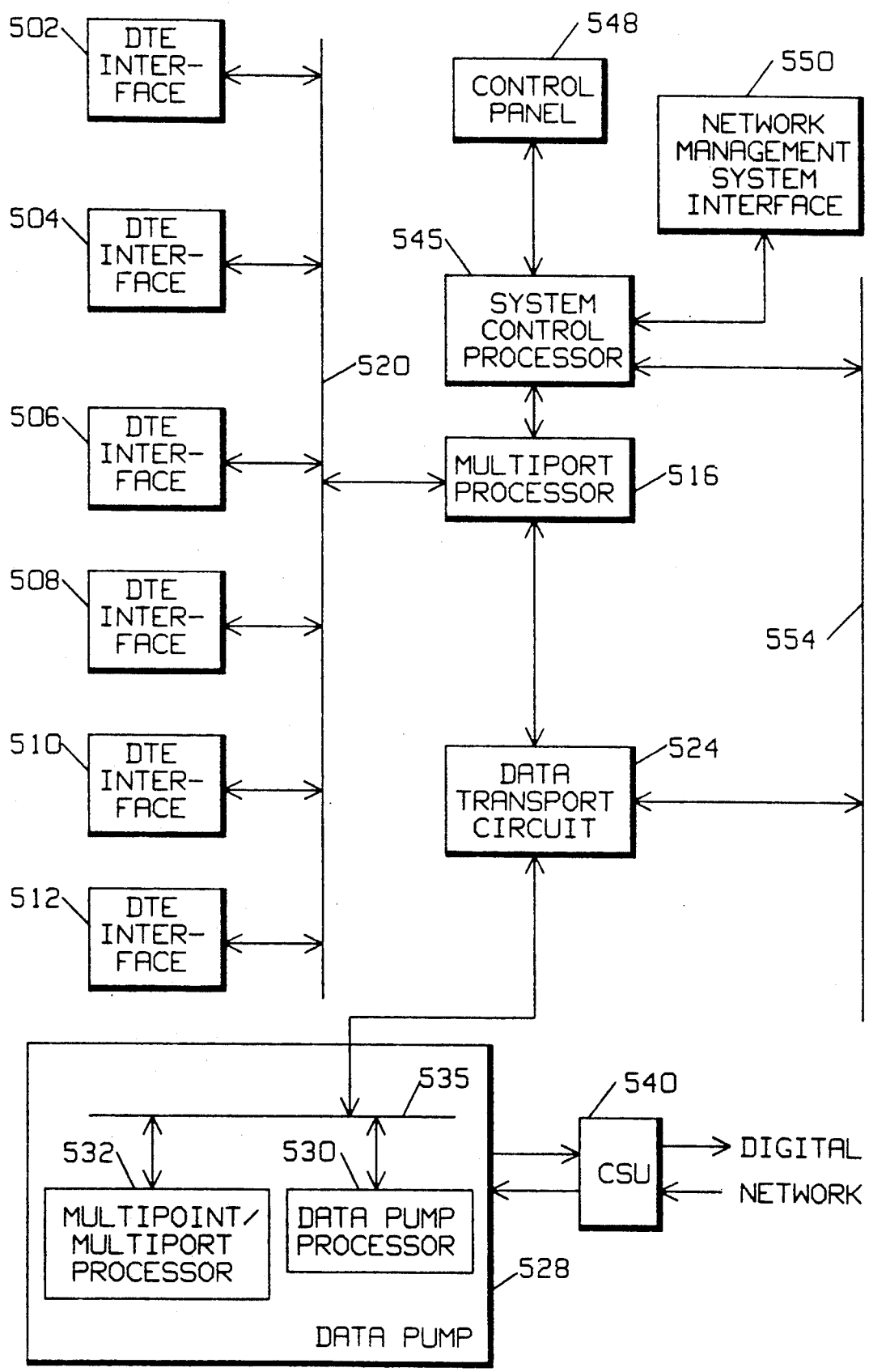
FIG. 11 is a functional block diagram of a multipoint multiport DSU according to the present invention.

Turning now to FIG. 11, a functional block diagram of a DSU operating as described above is shown. The DSU includes a plurality of DTE interfaces 502, 504, 506, 508, 510 and 512 for providing suitable attachment of DTE equipment using conventional RS-232 or similar interfacing technology. These interfaces communicate with a multiport processor 516 via a common bus 520. This multiprocessor interface provides control over bus 520 by determining which bus time slots are used by each channel (DTE interface) for transport of user data into and out of each DTE interface.

The multiport processor 516, which is preferably implemented using an Intel 80286 processor, passes data to and from a data transport circuit 524 which is preferably implemented as an ASIC. Data transport circuit 524 provides timing and control functions to the multiport processor 516 as well as buffering functions for the data flow. Data passes from the data transport circuit 524 to a data pump 528 which includes a data pump processor 530, implemented with an NEC V25 processor, and a multipoint multiport processor 532 which communicate via a common bus 535.

Outgoing data from data pump 528 is passed to a conventional customer service unit (CSU) 540 which also passes incoming data to data pump 528. The CSU 540 serves as an interface to the digital network in a conventional manner.

A system control processor 545 is implemented using an Intel 80188 processor and provides high level system control functions to the DSU to generally oversee configuration and strapping functions, etc. The system control processor 545 is coupled to a control panel 548 to permit the user to select operational options as well as strap settings, port speeds, etc. The system control processor 545 is coupled to a network management system interface which permits direct communication to a network management system such as that described in the above referenced Rosbury et al patent. The system control processor 545 is coupled to a bus 554 which gives it access to the data transport circuit 524.

The DTE interfaces (502, 504, 506, 508, 510 and 512) implement the requirements of the DTE interface such as synchronous timing for data transfers and operation of control signals to meet interface standards. The data is transferred between this block and the multiport processor 516 by reads and writes to registers in the multiport processor block 516. The actuation and monitoring of the DTE control signals is also performed by read and write operations to this block by the multiport processor 516.

The multiport processor 516 performs the TDM function on the DTE port data. It collects data received from the DTE port interfaces and inserts them into their assigned TDM data slots at the interface to the Data transport circuit 524. Likewise it extracts the data for each DTE port, from the TDM data at the data transport circuit interface, and writes it out to the assigned DTE interface.

The data transport circuit 524 performs the interface function for data and control information being transported between the different processors in the system. The interface to the multiport processor 516 is a TDM format. This uses a synchronous parallel byte transfer every TDM time slot. The start of the receive and transmit TDM frames is synchronized to the multipoint multiport processor 532. The interfaces to the system control processor 545 and the data pump 528 are through read and write registers in the data transport circuit 524. The data transport circuit thus provides a pathway for user data between the data pump 528 and the multiport processor 516 and a pathway for network management 550 and control panel 548 information between the system control processor 545 and the data pump 528.

The data pump 528 interfaces to the network using a TDM frame format that contains user data channels as well as network management channels and channels used to monitor and control the multipoint multiport synchronization. The data pump is responsible for sending and receiving multipoint multiport synchronization messages to the data pumps in other DSU's in the digital network for them to establish and maintain this synchronization. The data pump 528 does not alter the customer data fields in the TDM frames, it transfers these from/to the multiport processor through the data transport circuit 524. The data pump 528 extracts / inserts the network management messages into the TDM data for transport over the digital network. It also transports these messages to / / from the system control processor by way of writes and reads to registers in the data transport circuit 524.

The data pump 528 includes a data pump processor 530 implemented with a microprocessor and a multiport multipoint processor 532 which is implemented with an ASIC device. The data pump processor 530 is responsible for higher level tasks such as performing the algorithm to achieve multipoint multiport synchronization. The multipoint multiport processor 530 performs the more real-time aspects such as implementing the TDM frame time slots with counters synchronized to the digital network.

The system control processor 545 contains configuration information for the unit such as port speeds, etc. It also monitors the operation of other parts of the DSU. It translates information from one form to another when information is passed from one interface to another. For instance high level commands received from the network management interface 550 are translated to low level actions in the DSU such as writing a byte to a hardware register to change the speed of operation of an interface port. Another example is where detection of buttons being pressed on the control panel 548 cause corresponding messages to be displayed on same.

Figure 12:
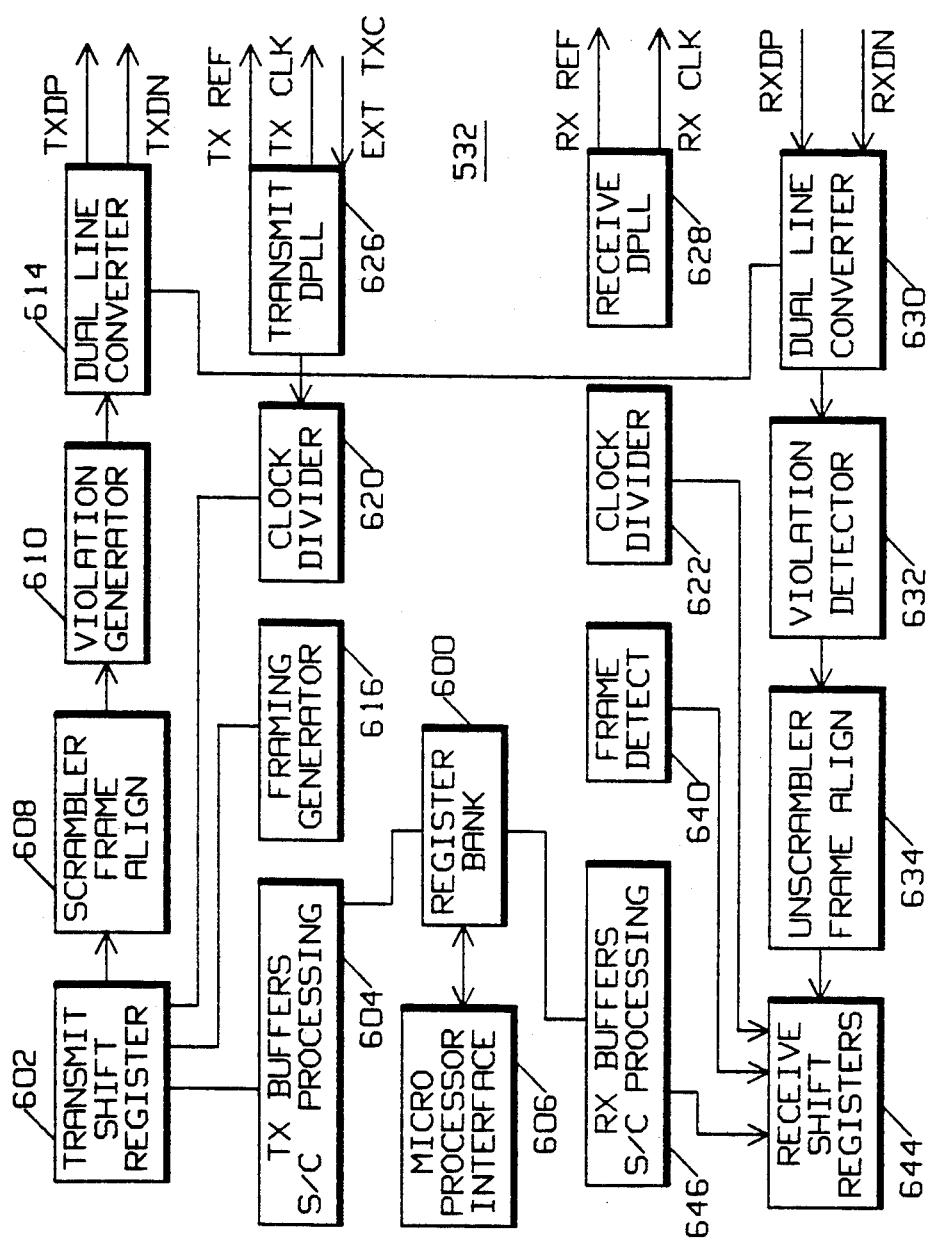
FIG. 12 is a functional block diagram of the multipoint multiport processor of the present invention.

The multipoint multiport processor 532 is shown in greater detail in FIG. 12. This circuit is implemented as a custom integrated circuit in the preferred embodiment, but this is not to be limiting. The multipoint multiport processor 532 includes a register bank 600. All data, control and status information is passed between the multipoint multiport processor 532 and the data pump processor 530 through the registers of this register bank 600. They are accessible from the processor 530, via a microprocessor interface 606, using read and write operations over the common data bus 535. A transmit shift register 602 combines the transmit data, secondary channel and control information into a serial bit stream after receiving the data from the Tx Buffer and S/C processing block 604. Block 604 performs serialization, buffering and sequencing of the secondary and control information for insertion into the transmit bit steam.

A scrambler / frame align circuit 608 receives the transmit bit stream from the transmit shift register 602. The scrambler portion of 608 is used for LADC applications to limit the energy transmitted on the lines by performing a conventional scrambling function. The frame align section of 608 is used in multiport multidrop to adjust the time when the transmit frame is started to align it with all other drops.

A Violation generator 610 is coupled to the output of the scrambler and frame align circuit 608 to generate the bipolar violation control sequences for support of the basic DDS (DDS-I) line format. The output of the violation generator 610 is fed to a Dual line converter 614. Dual line converter 614 splits the transmit stream into 2 digital output streams that will correspond to positive (TXDP) and negative (TXDN) bipolar pulses on the DDS line. These are converted to the bipolar format prior to transmission over the DDS line.

A frame generator 616 generates the DDS S/C, SDM and multiport multidrop framing pattern as required and provides those patterns to the transmit shift register for appropriate combination with the transmit data stream. Frame generator 616 also includes the counter circuit used to keep track of the proper timing for the transmit frame. This counter is adjusted by the ADJ command from the Central to effect alignment of the remote. The DSU shown in FIGS. 11 and 12 may be either remote or Central depending upon strapping configuration. Clock divider 620 divides the transmit bit clock down to a byte clock that defines the period of the transmit byte. The number of bits per transmitted byte is configured depending on the DDS service being used. Clock divider 622 divides the receive bit clock down to a byte clock that defines the period and boundaries of the receive byte. The number of bits per received byte is configured depending on the DDS service being used.

A Transmit Digital Phase-Locked Loop (DPLL) 626 is used in LD type applications when the unit is supplying the clocking information for the line. External transmit clock from the DTE can be selected for the source of the clocking or the DPLL can generate a stable clock internally. The DPLL is not used when connecting to the DDS network where the clocking information comes from a stable clock sources in the network. This also generates a 1200 Hz reference, that tracks the receive clock, that is used by other LSI chips in a DSU.

A Receive DPLL 628 is used to derive the receive clock from the received data pulses from the DDS receive line. The receive clock is used to clock in the received data. This also generates a 1200 Hz reference, that tracks the receive clock, that is used by other circuitry in the DSU.

A Dual line converter (receiver) 630 decodes the two incoming signals that correspond to positive and negative bipolar pulses on the DDS line to one serial data stream. The dual line converter 630 then sends these decoded signals to a Violation detector 632. This violation detector 632 detects violations of the normal bipolar encoding rules found in the received data. These are used in the basic DDS service (DDS-I) to pass control information to the DSU. The violation detector 632 passes its output on to an unscrambler and frame align circuit 634 which is a counterpart of the scrambler and frame aligner in the transmitter.

A Frame detector 640 in cooperation with the frame align circuit of 634 is used to detect and synchronize to the framing methods used in the received data. The DDS S/C and SDM framing of the standard DDS services are supported as well as the framing for multiport multidrop. The output of the unscrambler and frame align circuit 634 is passed to a Receive shift register 644. Here the serial received byte is converted to parallel and the data, secondary channel, control and framing information is extracted as required for the service configured for. The Rx buffers / S/C processing block 646 processes the incoming secondary channel and control information. It separates it and buffers it to the register bank 600.

In operation, a remote synchronizes its receive frame to the transmit frame of the Central. This synchronization takes place when the remote is powered up or after it has lost framing from the Central for a multiple number of frames.

The multipoint multiport processor 532 is commanded through the register bank 600 to start the process of locking to the framing pattern using a "frame search" flag. The multipoint multiport processor 532 will "unlock" from the present byte position it is looking for the frame byte in and start searching the bit stream starting on the next bit position. The multipoint multiport processor 532 scans every byte position in the incoming data stream until it detects a byte that matches the framing pattern in 640. At that time it stops scanning every position and monitors that byte position at the beginning of the next frame for the framing pattern. When this next frame byte is received, and if it matches the framing pattern, then the receiver locks to that byte position and sets appropriate status indicators that frame synchronization has been achieved. If this framing byte does not match the framing pattern then the multipoint multiport processor 532 resumes scanning for the framing pattern starting at the next bit position in the incoming bit stream. After frame lock has initially been achieved and reported in the status register the receiver maintains a lock to that byte position until commanded to start searching again. After frame lock has been achieved the multipoint multiport processor 532 monitors each byte in the frame position of incoming frames for errors and reports these in its status register. The changes of frame locking to random data is dependent on the frame size and the number of frames monitored before frame lock is performed.

After frame lock is achieved the controller 530 monitors the frame errors, integrates them, and commands the multipoint multiport processor 532 to start searching for frame again if too many frame errors are found. Frame lock is one of the qualifications for the data pump to use to report that it is receiving valid data, i.e., for data to go to the DTE ports etc.

The synchronization of all the remote stations in the Central's poll table. after loss of network multiport framing, is described here. A remote unit that does not have its transmit framing aligned with the Central's receive framing reference will be referred to as an unsynchronized unit. An unsynchronized unit transmits all ones so as not to interfere with the transmissions of other units. The remote has a flag indicating if it has had its transmit framing aligned to the Central's receive reference. this flag is referred to as the "in-sync" flag. This flag would be cleared upon power up and under some error conditions. At the beginning of the initial synchronization procedure the Central first transmits frames with all slots transmitted as marks for long enough to allow all remotes to lock to outbound framing. This is needed in the case where the Central unit has just powered up and the remotes are not locked onto outbound framing and therefore can not extract the polling channel messages. Next the Central issues a global command on the MP Poll channel for all the remote stations to clear their "in-sync" flag and to transmit marks in every bit of their transmit frame.

In order to initially synchronize all the units in the poll table the Central conducts a synchronization session with one unit at a time. once for every unit in the poll table. For each synchronization session the Central first transmits an EFS command to the unit using its diagnostic address. The Central expects a frame byte in every frame to be received from the remote for the Central to lock to the first remote's framing which is used as a reference.

Upon receiving an EFS command. in the control channel. containing its diagnostic address the remote enables the transmitter to transmit continuously with the framing pattern in the first time slot of the frame and with the rest of the time slots transmitted as all ones. If this is the first remote being aligned. the framing received by the Central will be used by the Central as the reference for aligning all remote stations. The Central waits up to a specified timeout for a frame byte from the remote.

If no response is received after the timeout then the EFS command is sent to the remote at the next diagnostic address in the poll table. The diagnostic address of a nonresponding remote will not be removed from the poll table here because the remote may be temporarily out of the synchronization with the outbound framing. Cases such as this will be handled after the user data are brought online. After a reference is established in the central, the remaining remotes are aligned to this reference. This is done by sending the SAP command to a remote causing the remote to send one frame with the framing pattern in the first frame slot followed by all marks as previously described. If a frame byte is received the Central measures how many bit and byte times this is off from the reference receive framing. This value is sent in an adjust message to the remote for it to use to update its transmit framing. When the remote receives the adjust message it adjusts its transmitter by that amount, sets its "in-sync" flag and transmits all marks in the frame. After the Central has transmitted the adjust message the Central is finished with the synchronization session for that remote.

After the Central has attempted to synchronize all the remote stations from the poll table it will then enable user data operation. This is done by sending a global enable command to the remotes. This enables the remote stations with their "in-sync" flag set to transmit multiport framing and control and data in multiport time slots of the multiport frame. After that point, the remaining diagnostic addresses can be polled along with the ones in the poll table. This allows user data to be enabled before having to poll all 254 diagnostic addresses.

The objective is to bring user data back online as soon as possible after a condition requiring resynchronization, i.e., line slips, power failures etc. To minimize this time, verification of remote's synchronization is not performed during the synchronization session in the preferred embodiment, but this is not to be limiting. Likewise checking for units that do not appear in the poll table is not performed during the synchronization session. Both of these tasks are performed after user data are brought online. The typical case would be that all units were properly synchronized and there are no remote units on the network that are not in the poll table. Only in the exceptional case will the user data have to be disrupted to do further synchronization of a remote. This methodology should minimize user down time for the majority of situations where resynchronization is required.

While the present invention has been disclosed in connection with a system operating under the control of a Microprocessor, those skilled in the art will appreciate that hard wired logic equivalents may also be devised. In addition, although the preferred embodiment uses a custom Application Specific Integrated Circuit (ASIC) in order to perform some of the functions, this is also not limiting since these functions could equally well be performed by other hardware, firmware or software based designs.

In addition, although the present invention has been disclosed in conjunction with the commonly available DDS services from AT&T, the techniques disclosed are equally applicable to other networks using similar digital bridging techniques without regard for service type or provider. The present invention could event be used, for example, with T1 frames if an appropriate digital bridge were present in the network so that operation in as sort of data mode were possible. Also, although the present invention has been described using positive logic, similar negative logic are within the scope of the present invention.

Thus it is apparent that in accordance with the present invention a method and apparatus that fully satisfies the objectives, aims and advantages is set forth above. While the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. A method for use in a digital data network wherein at least one digital bridging device combines digital data bits from a plurality of remote stations into a composite signal for transmission to a central station, comprising the steps of:

providing said central station with a plurality of central data ports;

providing each of said remote stations with at least one remote data port; there being at least one said remote data port for receiving said data bits for transmission to each one of said central data ports; at least two of said remote data ports being operable for receiving said data bits for transmission to a same one of said central data ports;

arranging at said remote stations said data bits from said remote ports into reoccurring fixed size frames with each one of said frames having a plurality of time slots; there being at least one of said time slots assigned to transmit said data bits to each of said central ports; said assignment of time slots to said central ports being the same at each of said remote stations;

initially aligning said frames from different said remote stations by adjusting transmission times from at least one of said remote stations so as to cause said frames from said different remote stations to arrive at said central station simultaneously;

transmitting said aligned frames from said remote stations to said central station;

after initially aligning said frames, monitoring to determine if said inbound frames from said remote stations remain in time alignment; and if said inbound frames from said remote stations do not remain in time alignment, further aligning said frames from different said remote stations by adjusting transmission times from at least one of said remote stations so as to again cause said frames from said different remote stations to arrive at said central station simultaneously.

2. The method of claim 1 wherein said step of monitoring further includes the steps of:

(a) selecting one of said remote stations from a polling list;

(b) polling said remote station from said central station to determine if said remote station is properly aligned;

(c) if said remote station is properly aligned, selecting a next said remote station from said polling list and repeating step (b) for said next remote station; and (d) if said remote station is not properly aligned in step (b), proceed with said step of further aligning said frames to correct alignment of said remote station and then going to step (a).

3. The method of claim 2 wherein said step of arranging said data bits into said frames further includes the step of defining at least one time slot in each of said frames for responses by said remote stations to said polling from said central station so that the transmission of said data bits from said remote stations is not interrupted by said polling.

4. The method of claim 2 wherein said step (d) comprises determining if a one bit timing slip has occurred and adjusting said alignment by said one bit timing.

5. The method of claim 4 wherein said determining step is performed by transmitting a space surrounded by marks in a predetermined position in a frame and determining if said space is misplaced by one bit time when received.

6. The method of claim 1 wherein said step of arranging said data bits into said frames includes providing at least one time slot for transmission of polling responses from said remote stations, and wherein said step of monitoring further includes the steps of:

(a) selecting one of said remote stations from a polling list;

(b) transmitting a command to said selected remote station requesting an acknowledgement response be transmitted by said selected remote station to said central station in said time slot for said polling responses; and (c) listening at said central station for said acknowledgement response from said selected remote station, whereby receipt of said acknowledgement response by said central station verifies, without interrupting said data bits contained in the other said time slots, that said selected remote station remains in time alignment.

7. The method of claim 6 further comprising repeating said steps (a), (b), and (c) for each of said remote stations on said polling list.

8. The method of claim 7 further comprising repeating more than once said steps (b) and (c) for a given one of said remote station not providing said acknowledgement response.

9. The method of claim 6 further comprising, if said acknowledgement response is not received in said step (c), proceeding with said step of further aligning said frames, said step of further aligning said frames including the steps of:
   commanding all the remote stations to transmit an idle signal, and
   correcting the alignment of said selected remote station.

10. The method of claim 9 further comprising, prior to said step of further aligning, the steps of:
   transmitting a poll message from said central station to said selected remote station if said acknowledgement response is not received by said central station in error free form, said poll message including an address of said selected remote station:
   at said selected remote station, detecting said address; and
   transmitting a sequence of spaces from said selected remote station over said network, said sequence of spaces being positioned in time to overlap any marks transmitted by other said remote stations.
   whereby said sequence of spaces is received by said central station regardless of lack of said time alignment and thereby confirms that said selected remote station is on line.

11. The method of claim 10, wherein said sequence of spaces overlaps a time designated for use by a frame synchronization pattern.

12. The method of claim 11, wherein said sequence of spaces is at least as long as the length of said frame.

13. The method of claim 1 wherein said step of further aligning said frames includes the steps of commanding all of said remote stations to enter an idle state;
   having a given one of said remote station transmit a signal;
   measuring a difference in time between receipt of said transmitted signal and a reference time; and
   adjusting a transmission time for transmissions from said given one of said remote stations so that said measured difference in time is eliminated.

14. The method of claim 13 further comprising the step of:
   commanding said given one of said remote stations to return to said idle state after said step of further alignment.

15. The method of claim 14, further comprising the step of:
   commanding said given one of said remote stations to leave said idle state and transmit user data after all of said remote stations have been aligned.

16. The method of claim 13, wherein said step of initially aligning said frames includes the steps of commanding a given one of said remote stations to transmit a signal; measuring a difference in time between receipt of said transmitted signal and a reference time; and adjusting a transmission time for transmissions from said given one of said remote stations so that said measured difference in time is eliminated.

17. The method of claim 13, further comprising the step of setting an "in-sync" flag to a predetermined value in said given one of said remote stations to indicate that synchronization has been established.

18. The method of claim 1 wherein said step of further aligning includes the steps of:
   at said central station, issuing a global command for all remote stations to transmit marks in each frame location;
   commanding a first remote station to transmit a frame containing a predetermined pattern;
   establishing a reference time at said central station based upon time of receipt of said predetermined pattern;
   commanding a next remote station to transmit said predetermined pattern;
   measuring a relative delay in receiving said predetermined pattern frame from said next remote station;
   commanding said next remote station to adjust its transmission time by an amount which causes transmissions from said first and next remote stations to arrive at said central station in time alignment.

19. The method of claim 18, wherein said first remote station is selected according to its position on a polling list.

20. The method of claim 1, further comprising the step of coupling each of said central ports to a different one of a plurality of data applications, and
   at least said data application coupled to said central port having said at least two remote ports transmitting data thereto comprising a multipoint data application.

21. The method of claim 1, wherein said at least two said remote data ports receiving data for transmission to the said same one of said central data ports including said at least two remote data ports being disposed at different said remote stations, and
   said assigned time slots in said frames to each of said central data ports resulting in all said remote data ports associated with said same one of said central port transmitting said data bits in the same said time slots,
   whereby the corresponding remote data ports at each remote station are assigned the same time slots.

22. The method of claim 1, wherein said digital bridging device uses a logical AND operation and said step of providing including providing at least two of said remote data ports which receive said data bits for transmission to each one of said central data ports, and
   each of said at least tow said remote data ports belonging to different ones of said remote stations.

23. The method of claim 1, wherein said step of providing includes providing at least one of said remote stations with at least two of said remote data ports for receiving said data bits for transmission to different said central ports, and each of said central ports being associated with one of a plurality of data applications.

24. A digital data communication system for a digital network wherein digital data bits are transported between a plurality of locations, each said data bit lasting for a predetermined bit time, comprising:

a central station coupled to said network, said central station including a plurality of central data ports, each of said central data ports being associated with a different one of a plurality of independent data applications;

a plurality of remote stations coupled to said network, each of said remote stations having at least one remote data port associated with one of said data applications, the number of said remote data ports being greater than the number of said central data ports, there being a least one of said remote data ports associated with each of said data applications;

said remote stations each including framing means for arranging said data bits from said at least one remote data port into a plurality of time-division multiplexed frames for transmission through said digital network to said central station, each of said frames having a plurality of time slots with at least one of said time slots being assigned to each of said data applications;

alignment means for initially aligning said frames transmitted by said plurality of remote stations so to cause said frames to arrive at said central station simultaneously by adjusting transmission times from at least one of said remote stations by an integer number of said bit times;

means for monitoring alignment of said frames to determine if said frames from said remote stations remain in time alignment after initial alignment of said frames; and said alignment means, if said frames from said remote stations do not remain in time alignment, being operable for further alignment of said frames from different said remote stations by again adjusting transmission times from at least one of said remote stations so as to cause said frames from said different remote stations to arrive at said central station simultaneously.

25. The digital data communication system of claim 24 wherein said means for monitoring further includes:
(a) selection means for sequentially selecting each of said remote stations from a polling list; and
(b) polling means for polling each of said selected remote stations from said central station to determine if said selected remote station is properly aligned prior to selection of a next said remote station from said polling list by said selecting means; and said alignment means providing said further alignment if said selected remote station is not properly aligned to correct alignment of said selected remote station prior to selection of a next said remote station from said polling list by said selecting means.

26. The digital data communication system of claim 25 wherein each of said frames further includes at least one time slot for responses by said remote stations to said polling from said central station so that the transmission of said data bits from said remote stations is not interrupted by said polling.

27. The digital data communication system of claim 25 wherein said polling means includes one-bit slip determining means for determining if a one bit timing slip has occurred and adjusting said alignment by said one bit timing.

28. The digital data communication system of claim 27 wherein said one-bit determining means is operable for transmitting a space surrounded by marks in a predetermined position in an outbound frame sent from said central station and for determining if said space is misplaced by one bit time when received.

29. The digital data communication system of claim 24 wherein said framing means being further operable for providing at least one time slot for transmission of polling responses from said remote stations and wherein said monitoring means further includes:
(a) selecting means for selecting one of said remote stations from a polling list;
(b) polling means for transmitting a command to said selected remote station requesting an acknowledgement response be transmitted by said selected remote station to said central station in said time slot for said polling responses; and
(c) listening means for listening at said central station for said acknowledgement response from said selected remote station, whereby receipt of said acknowledgement response by said central station verifies, without interrupting said data bits contained in the other said time slots, that said selected remote station remains in time alignment.

30. The digital data communication system of claim 29, wherein said polling means transmits said command again for said remote station not providing said acknowledgement response after transmitting said command a first time.

31. The digital data communication system of claim 29 wherein said alignment means, if said acknowledgement response is not received, includes means for commanding all the remote stations to transmit an idle signal; and means for correcting the alignment of said selected remote station.

32. The digital data communication system of claim 31 further comprising:
mean for transmitting, prior to said further aligning by said alignment means, a poll massage from said central station to said selected remote station if said acknowledgement response is not received by said central station in error free form, said poll message including an address of said selected remote station;
means, at said selected remote station, for detecting said address; and
means, at said selected remote station, transmitting a sequence of spaces to said central station over said network, said sequence of spaces being positioned in time to overlap any marks transmitted by other said remote stations,
whereby said sequence of spaces is received by said central station regardless of lack of said time alignment and thereby confirms that said selected remote station is on line.

33. The digital data communication system of claim 32 wherein sad sequence of spaces overlaps a time designated for use by a frame synchronization pattern.

34. The digital data communication system of claim 33 wherein said sequence of spaces is at least as long as the length of said frame.

35. The digital data communication system of claim 24 wherein said alignment means, if sad frames do not remain in alignment, is operable for commanding all of said remote stations to enter an idle state;
  having a given one of said remote station transmit a signal;
  measuring a difference in time between receipt of said transmitted signal and a reference time; and
  adjusting a transmission time for transmission from said given one of said remote stations so that said measured difference in time is eliminated.

36. The digital data communication system of claim 35 further comprising means for commanding said given one of said remote stations to return to said idle state after said further alignment by said alignment means.

37. The digital data communication system of claim 36 further comprising means for commanding said given one of said remote stations to leave said idle state and transmit user data after all of said remote stations have been aligned by said alignment means.

38. The digital data communication system of claim 35 wherein said alignment means, when initially aligning said frames, is operable for commanding a given one of said remote stations to transmit a signal;
  measuring a difference in time between receipt of said transmitted signal and a reference time; and
  adjusting a transmission time for transmissions from said given one of said remote stations so that said measured difference in time is eliminated.

39. The digital data communication system of claim 35 further comprising the step of setting an "in-sync" flag to a predetermined value in said given one of said remote stations to indicate that synchronization has been established.

40. The system of claim 24 wherein at least one of said remote stations includes a plurality of remote data ports, at least two of said plurality of remote data ports of said at least one remote station being associated with different ones of said plurality of data applications.

* * * * *